US011232068B2

(12) United States Patent
Dhanasekaran et al.

(10) Patent No.: US 11,232,068 B2
(45) Date of Patent: Jan. 25, 2022

(54) UNIFIED DOCUMENT RETENTION MANAGEMENT SYSTEM

(71) Applicant: Microsoft Technology Licensing, LLC, Redmond, WA (US)

(72) Inventors: Kannan Dhanasekaran, Redmond, WA (US); Tho Van Nguyen, Kenmore, WA (US); Le-Wu Tung, Redmond, WA (US); Nakul Garg, Sammamish, WA (US); Mingquan Xue, Redmond, WA (US); Gagandeep Kohli, Kirkland, WA (US); Dheepak Ramaswamy, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1149 days.

(21) Appl. No.: 15/469,762

(22) Filed: Mar. 27, 2017

(65) Prior Publication Data
US 2018/0276223 A1   Sep. 27, 2018

(51) Int. Cl.
*G06F 16/11* (2019.01)
*G06F 16/16* (2019.01)
(Continued)

(52) U.S. Cl.
CPC .......... *G06F 16/125* (2019.01); *G06F 16/113* (2019.01); *G06F 16/13* (2019.01); *G06F 16/162* (2019.01); *G06F 16/1844* (2019.01)

(58) Field of Classification Search
CPC .. G06F 16/125; G06F 16/162; G06F 16/1844; G06F 16/113; G06F 16/13
See application file for complete search history.

(56) References Cited

U.S. PATENT DOCUMENTS 6,978,376 B2   12/2005 Giroux et al.
8,019,790 B2    9/2011 Gulbeden et al.
(Continued)

OTHER PUBLICATIONS

"Archive Manager 5.0.1—Retention Policy Guide", Retrieved from: https://support.quest.com/technical-documents/archive-manager/5.0.1/retention-policy-guide#TOPIC-207569, Retrieved Date: Mar. 2, 2017, 2 pages.

(Continued)

*Primary Examiner* — Matthew Ell
*Assistant Examiner* — Lahcen Ennaji
(74) *Attorney, Agent, or Firm* — Newport IP, LLC; Jacob P. Rohwer

(57) ABSTRACT

A unified document retention management system exposes a retention policy management portal to enable a user to selectively prescribe a unified retention policy to multiple productivity platforms to deploy the unified retention policy across the user selected productivity platforms. Data retention rules of the unified retention policy may define actions to be performed with respect to files that satisfy certain predefined conditions. An exemplary data retention rule prescribes a retention age threshold to files that have been tagged with a particular label. Files may be manually labeled by users and/or may be automatically labeled by the system in accordance with one or more smart label rules. The retention age threshold may be enforced for such tagged files by preventing the files from being deleted and/or modified prior to them reaching the retention age threshold. Then the files may automatically be purged from system storage upon reaching the retention age threshold.

21 Claims, 8 Drawing Sheets

(51) Int. Cl.
   *G06F 16/182* (2019.01)
   *G06F 16/13* (2019.01)

(56) References Cited

U.S. PATENT DOCUMENTS

| | | | |
|---|---|---|---|
| 8,527,468 | B1 | 9/2013 | Crafford et al. |
| 8,805,806 | B2 | 8/2014 | Amarendran et al. |
| 9,158,785 | B1 | 10/2015 | Rudkowski et al. |
| 9,201,877 | B1 * | 12/2015 | Humby .................. G06F 16/00 |
| 2005/0091275 | A1 | 4/2005 | Burges et al. |
| 2007/0100950 | A1 * | 5/2007 | Bornstein ............ G06Q 10/107 |
| | | | 709/206 |
| 2007/0276843 | A1 | 11/2007 | Lillibridge et al. |
| 2008/0109448 | A1 | 5/2008 | Aboel-nil et al. |
| 2008/0154956 | A1 | 6/2008 | Debie |
| 2008/0168135 | A1 | 7/2008 | Redlich et al. |
| 2008/0263565 | A1 | 10/2008 | Luther et al. |
| 2009/0177704 | A1 * | 7/2009 | Consul ................. G06Q 10/107 |
| 2010/0094809 | A1 | 4/2010 | Consul et al. |
| 2010/0138500 | A1 | 6/2010 | Consul et al. |
| 2010/0306283 | A1 * | 12/2010 | Johnson ................ G06F 16/125 |
| | | | 707/803 |
| 2011/0093471 | A1 * | 4/2011 | Brockway ............... G06F 21/10 |
| | | | 707/747 |
| 2012/0221811 | A1 * | 8/2012 | Sparkes ................ G06F 16/125 |
| | | | 711/159 |
| 2013/0124552 | A1 | 5/2013 | Stevenson et al. |
| 2013/0191460 | A1 | 7/2013 | Caldwell et al. |
| 2014/0149366 | A1 | 5/2014 | Huang |
| 2014/0282910 | A1 | 9/2014 | Palmer et al. |
| 2015/0161266 | A1 | 6/2015 | Conradt et al. |
| 2015/0248419 | A1 | 9/2015 | Motoyoama |
| 2016/0004882 | A1 | 1/2016 | Ballai et al. |
| 2016/0041972 | A1 | 2/2016 | Lehmann et al. |
| 2016/0132252 | A1 * | 5/2016 | Bish ...................... G06F 3/0652 |
| | | | 711/159 |
| 2017/0131944 | A1 | 5/2017 | Bruckner et al. |
| 2017/0308546 | A1 | 10/2017 | Xia |
| 2018/0253218 | A1 | 9/2018 | Levesque et al. |
| 2018/0276232 | A1 | 9/2018 | Dhanasekaran et al. |

OTHER PUBLICATIONS

"Driving Maximum Business Value from Records and Information Management", Retrieved from: https://www.ironmountain.com/resources/best-practice-guides/d/driving-maximum-business-value-from-records-and-information-management, Feb. 5, 2014, 24 Pages.

"OwnCloud Enterprise Edition Features", Retrieved from: https://owncloud.com/features/, Retrieved Date: Mar. 2, 2017, 8 Pages.

"Top 10 Reasons to Audit the Integrity of Your Data", In White paper of Iron Mountain, Mar. 2, 2017, 6 Pages.

"Final Office Action Issued in U.S. Appl. No. 15/469,911", dated Jun. 21, 2019, 30 Pages.

"Non Final Office Action Issued in U.S. Appl. No. 15/469,911", dated Dec. 21, 2018, 25 Pages.

Redmond, Tony, "Exchange 2010 MRM: Implementing New Retention Policies", Retrieved from: https://www.itprotoday.com/email-and-calendaring/exchange-2010-mrm-implementing-new-retention-policies, Jul. 22, 2010, 13 Pages.

Redmond, Tony, "Managing Compliance in Microsoft Exchange Server 2010", Retrieved from: https://www.microsoftpressstore.com/articles/article.aspx?p=2228442&seqNum=3, Nov. 24, 2010, 34 Pages.

Shaw, Victoria, "NonProfit Document Retention Policy 101", Retrieved from: https://www.smartfile.com/blog/nonprofit-document-retention-policy, Aug. 15, 2016, 6 Pages.

"Non Final Office Action Issued in U.S. Appl. No. 15/469,911", dated Feb. 4, 2020, 28 Pages.

"Retain Unified Archiving", https://www.gwava.com/unified-archiving, Retrieved on: Feb. 28, 2017, 5 pages.

"A Unified Records Management Approach to Maximize SharePoint and Social Media", http://www.ironmountain.com/Knowledge-Center/Reference-Library/View-by-Document-Type/White-Papers-Briefs/A/A-Unified-Records-Management-Approach-to-Maximize-SharePoint-and-Social-Media.aspx, Retrieved on: Feb. 28, 2017, 3 pages.

"Final Office Action Issued in U.S. Appl. No. 15/469,911", dated Sep. 2, 2020, 36 Pages.

* cited by examiner

Productivity Suite - Security and Compliance — URP Admin. 144

New Unified Retention Policy Rule

☑ Name your Policy

☐ Settings

☑ Set your Locations

☐ Review your Settings

*Decide if you want to retain content, delete it, or both*

Do you want to retain content?

○ Yes, I want to retain certain content for at least ___ years

● Yes, I want to define a retention age threshold of _7_ years

○ No, just delete content when it reaches ___ years

Do you want to define advanced retention settings for your new rule called "Tax Record"?

○ No

● Yes, apply this label to content that matches certain conditions

[+ Add Condition]   SentDateRange: (12/1/2016-1/15/2017); Sender: AnyAccountingTeamMember

[Edit Custom Search Query]   "Tax*" OR "Form 1099*" OR "IRS" OR "EIN" OR "Form 10-Q"

○ Yes, apply this label to content that contains sensitive content

○ Yes, apply this label to files that match a defined "Fingerprint"

Retention-Policy-Management-Portal (112)

200

DEVICE 146

UNIFIED DOCUMENT RETENTION MANAGEMENT SYSTEM

BACKGROUND

Organizations develop data retention policies to establish procedures for retaining information for operational or regulatory compliance purposes. For instance, an organization may develop a data retention policy to abide by government regulations that require certain financial documents to be retained for at least a predefined minimum retention period. Some conventional productivity platforms include basic data retention policy capabilities. Unfortunately, conventional productivity platforms require users to specifically develop and manage data retention rules that are unique to each individual productivity platform. For instance, although a conventional email platform may enable an administrator to develop a data retention rule with respect to a user's inbox, such a data retention rule will have to be developed within and be unique to this conventional email platform. Therefore, a data retention rule that is developed within the conventional email platform cannot be deployed against other conventional productivity platforms, such as instant message systems, video recording systems, files systems, etc. For businesses utilizing numerous different conventional productivity platforms, successfully implementing a data retention policy across the entire organization may require policy administrators to develop and manage redundant data retention rules. Furthermore, the data retention policy capabilities of these conventional productivity platforms deploy data retention rules in only a rudimentary manner. For instance, a conventional email platform may be configured to deploy a data retention rule for a particular folder, but may be unable to recognize varying characteristics of messages within that particular folder to selectively deploy the data retention rule against some, but not all, of the messages of the particular folder.

It is with respect to these considerations and others that the disclosure made herein is presented.

SUMMARY

Techniques described herein provide for a unified document retention management system that provides benefits over conventional document retention management systems by, for example, enabling a unified retention policy to be applied across multiple productivity platforms. Generally described, configurations disclosed herein enable a system to expose a retention policy management portal (RPMP) to enable a user to selectively prescribe a unified retention policy to multiple productivity platforms and, ultimately, to deploy the unified retention policy across the user selected productivity platforms. As used herein, a "unified retention policy" refers generally to a set of data retention rules that are configured to be deployed across multiple productivity platforms. An exemplary unified retention policy may include one or more data retention rules that are configured according to a rule development scheme that is shared across various platforms of a productivity suite. As a specific example, a productivity suite may include multiple productivity platforms (e.g. a communication platform providing email and/or chat capabilities, a file hosting platform providing cloud file storage capabilities, etc.) as well as the RPMP to enable a user to develop and manage data retention rules that are "unified" in the sense that individual data retention rules can be selectively deployed across multiple productivity platforms. As used herein, the term "prescribe" may refer generally to authoritatively establishing and/or defining policies and/or assigning policies to platforms, users, and/or groups of users. As used herein, the term "deploy" may refer generally to enforcing or otherwise bringing into action.

According to aspects of the present disclosure, a system is provided for exposing the RPMP to enable a user to develop and/or manage aspects of a unified retention policy that is configured to be deployed across multiple productivity platforms. For instance, the RPMP may enable a user to generate the unified retention policy by developing individual data retention rules and then selecting various productivity platforms to prescribe the unified retention policy to. The data retention rules of the unified retention policy may define one or more actions to be performed with respect to files that satisfy certain predefined conditions. The system may further be configured to deploy the unified retention policy across the user selected productivity platforms by analyzing data corresponding to each selected productivity platform to identify files that satisfy the predefined conditions. Then, the system may cause associated actions to be performed with respect to these files. For example, a user may generate an instruction using the RPMP to prescribe the unified retention policy to both a first productivity platform and a second productivity platform. Based on the instruction, the system may scan data from each of the first productivity platform and the second productivity platform to identify corresponding sets of files that satisfy a specific predefined condition. Then, the system may cause an action corresponding to the specific predefined condition to be performed with respect to the individual files in these sets of files.

For illustrative purposes, consider a scenario where an organization provisions its employees with access to both a communication platform (e.g. an email platform and/or a chat platform) and a file hosting platform (e.g. a cloud-based file storage service). Furthermore, assume that whatever operational and/or regulatory compliance considerations apply to the communication platform also apply to the file hosting platform. For example, the organization may be required to retain tax related documents for at least a predefined period of time regardless of whether such documents reside in an email inbox or on a cloud storage folder. In such a case, the organization may develop a unified retention policy that defines a retention age threshold for tax related files. As used herein, a "retention age threshold" refers generally to a predefined age of a document above which a particular action will automatically take place and below which the particular action is prevented from taking place. An exemplary unified retention policy (and/or individual data retention rule thereof) may define a retention age threshold at which tax related documents are to be automatically purged from the organization's data storage and below which such documents are prevented from being purged from the organization's data storage. In some instances, a retention age threshold may define a single time period that corresponds to both retention and deletion. For example, a retention age threshold may define a single time period of seven years that defines both how long the system will prevent a file from being deleted and/or modified and also defines the age at which the system will automatically delete the file. In some instances, retention age threshold may define multiple time periods, e.g. a first time period corresponding to retention and a second time period corresponding to deletion. For example, such a retention age threshold may instruct the system to retain an individual file for at least a first period of time (e.g. 3 years) and also to automatically delete the individual file after a second period of time (e.g. 5 years). Accordingly, under these circumstances a user may be able to delete the individual file after the first period of time passes and before the second period of time has passed.

Under these circumstances, the system described herein may obtain productivity platform data corresponding to each of the communication platform and the file hosting platform. Exemplary productivity platform data includes, but is not limited to, computer readable instructions that enable the system to navigate an organizational scheme of the productivity platforms and/or analyze different data file types that are associated with various productivity platforms. For example, the productivity platform data may inform the system of an organizational scheme used by a productivity platform to store productivity data such as, for example, emails and word processing documents. As another example, the productivity platform data may enable the system to read, modify, and/or analyze an email file type (e.g. a Personal Storage Table file and/or an HTML, email file) that is associated with the communication platform as well as a word processing file type (e.g. an Office Open XML Document) and/or a spreadsheet file type (e.g. an Office Open XML Workbook) that is associated with the file hosting platform. The system may further determine a unified retention policy that associates one or more actions (e.g. deleting a file) with various predefined conditions (e.g. the file meeting or exceeding a retention age threshold). The system may also expose the RPMP to enable a user to prescribe the unified retention policy to both the communication platform and the file hosting platform.

Once the unified retention policy has been prescribed to both the communication platform and the file hosting platform, the system may enforce the unified retention policy across each of these platforms. In some implementations, enforcing the unified retention policy across platforms may include analyzing data corresponding to each productivity platform. For example, the system may analyze data associated with the communication platform to identify a first set of files that meet the various predefined conditions of the unified retention policy as well as data associated with the file hosting platform to identify a second set of files that also meet the various predefined conditions of the unified retention policy. As described above, in some implementations, the various productivity platforms may be associated with various file types. For example, the first set of files identified from the communication platform may include a plurality of HTML email files whereas the second set of files identified from the file hosting platform may include a plurality of Office Open XML Documents and/or Office Open XML Workbooks.

Upon identifying the first set of files and the second set of files that satisfy the various predefined conditions, the system may then cause the one or more actions associated with these predefined conditions to be performed with respect to the first set of files and the second set of files. For example, continuing with the current illustrative scenario, further suppose that the unified retention policy defines a single predefined condition that is a retention age threshold of seven years and a single predefined action that is purging files that reach or exceed the retention age threshold from storage corresponding to the productivity platforms. Under these circumstances, the system may purge the communication platform's storage of a set of email files that were sent and/or received at least seven years ago and further purge the file hosting platform's storage of a set of word processing files and/or spreadsheet files that were created and/or modified at least seven years ago. Furthermore, in some implementations, the system may forcibly retain files that have yet to reach the retention age threshold. For example, upon a user attempting to delete a three-year-old tax related email, the system may deny the user's delete request and inform the user that she is not permitted to delete this particular tax related file because it has not yet reached the retention age threshold. Then, upon this particular tax related email reaching seven years of age since having been sent and/or received, the system may automatically purge this tax related email from one or more storage devices of the communication platform. In some implementations, the one or more actions may include indefinitely retaining a particular file. For example, in some implementations, a particular data retention rule may instruct the system to indefinitely retain a particular file rather than purging the particular file from system storage in accordance with a retention age threshold.

In some implementations, the system may identify predefined labels that have been associated with individual files to determine one or more data retention rules, of the unified retention policy, to apply to these individual files. An exemplary predefined label may be a "Tax Record" that is generated to specifically label individual files as being tax records and, therefore, subject to one or more tax related data retention rules. In some implementations, the system may be configured to enable an information worker to manually label individual files. For example, the system may enable an information worker to alter metadata associated with the individual files to include (or otherwise be associated with) the "Tax Record" label. In some implementations, the system may be configured to analyze individual files to identify relevant characteristics and, based thereon, automatically apply one or more labels to files having these relevant characteristics. For example, the system may be configured to analyze emails within a particular user's inbox to identify a subset of these emails that positively match a user-defined query and then to automatically label emails of this subset. As a more specific but nonlimiting example, a retention policy administrator may develop a Keyword Query Language (KQL) query that is specifically configured to identify tax related documents. The retention policy administrator may further associate the "Tax Record" label with this KQL query within the unified retention policy. Then, upon the retention policy administrator prescribing the unified retention policy to the communication platform and the file hosting platform, the system may analyze files corresponding to the communication platform and the file hosting platform and apply the "Tax Record" label to positive results of the KQL query. Automatically applying predefined labels based on characteristics of individual files provides benefits over relying on information workers to manually label individual files. Such benefits include, for example, applying labels more uniformly across an entire organization and reducing the burden on information workers of abiding by an organization's retention policies.

Configurations disclosed herein provide marked improvement to the technological field of document retention management for at least the reason that conventional document retention management systems lack the ability to deploy and/or enforce a unified retention policy across multiple discrete productivity platforms. In particular, conventional document retention management systems generally are specific to individual productivity platforms and, therefore, require rules to be specifically developed according to a rule scheme associated with each individual productivity platform. Stated alternatively, within conventional document retention management systems, a retention policy that is developed with respect to a particular productivity platform cannot be uniformly applied across a different productivity platform. Accordingly, configurations disclosed herein improve upon conventional document retention management systems by uniformly applying a unified retention policy across multiple platforms. These techniques mitigate the necessity of duplicative data retention rules being developed across these multiple platforms. Furthermore, conventional document retention management systems lack the ability to analyze individual files to identify certain characteristics and, based thereon, automatically associate files having these characteristics with labels to define which data retention rules should be applied thereto. For example, conventional systems lack the ability to identify a subset of documents to associate with a particular label (e.g. a "Tax Record" label) and, ultimately, to selectively apply one or more data retention rules to this subset of documents. Accordingly, configurations disclosed herein further improve upon conventional document retention management systems by automatically and selectively applying individual data retention rules based on individual file contents and/or file characteristics. These techniques mitigate the necessity of information workers manually analyzing and applying labels to individual files.

It should be appreciated that, although described in relation to a system, the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings. This Summary is provided to introduce a selection of concepts in a simplified form that are further described below in the Detailed Description.

This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

FIG. 2 illustrates aspects of a user interface (UI) corresponding to a retention policy management portal (RPMP) that can be displayed on a device to enable a user to define a smart label rule based on user specified conditions and/or a user defined search query as described herein. Similar to other interfaces described herein, this example UI can be displayed on a variety of device types, such as a desktop computer, mobile device or a combination of devices.

Figure 3:
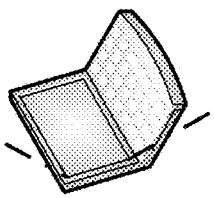

FIG. 3 illustrates aspects of a UI corresponding to a RPMP that can be displayed on a device to enable a user to define a smart label rule to automatically label files that contain one or more sensitive content types as described herein.

Figure 4:
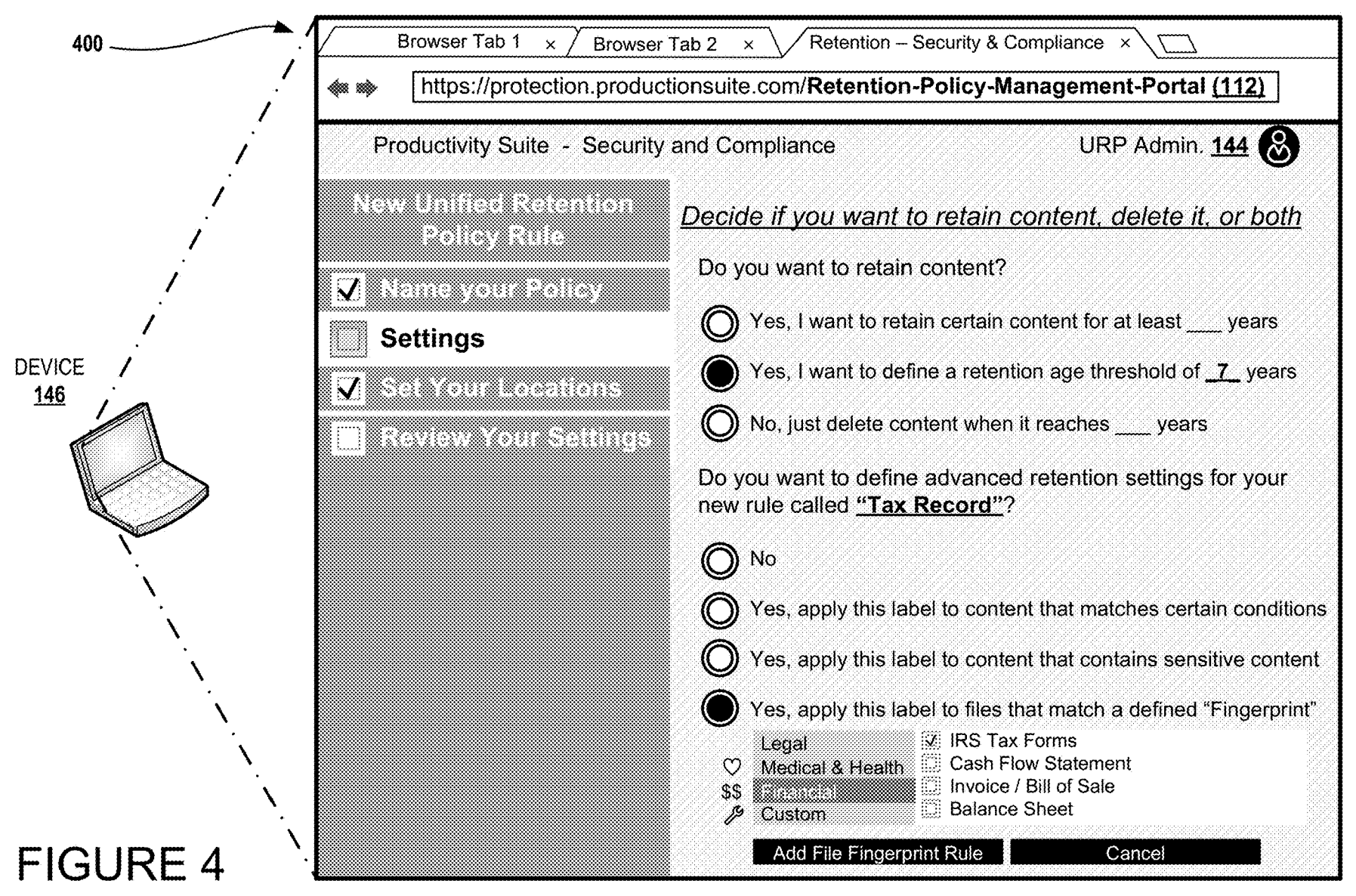

FIG. 4 illustrates aspects of a UI corresponding to a RPMP that can be displayed on a device to enable a user to define a smart label rule based on a file matching a pre-defined document fingerprint as described herein.

Figure 5:
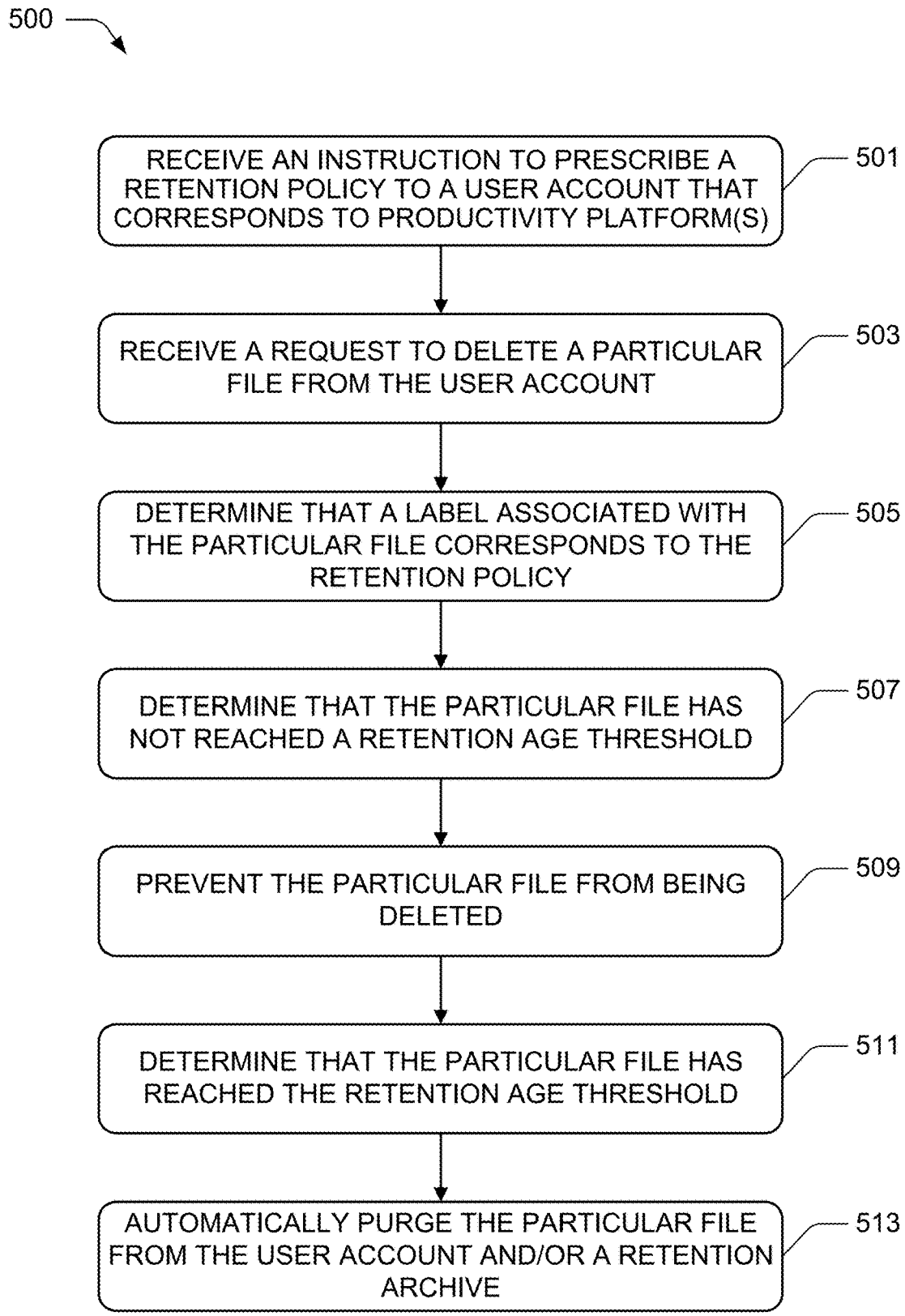

FIG. 5 is a flow diagram of an illustrative process to prevent a particular file from being deleted when the particular file has not reached a retention age threshold and then automatically purging the particular file from a user account when the particular file does eventually reach the retention age threshold.

Figure 6:
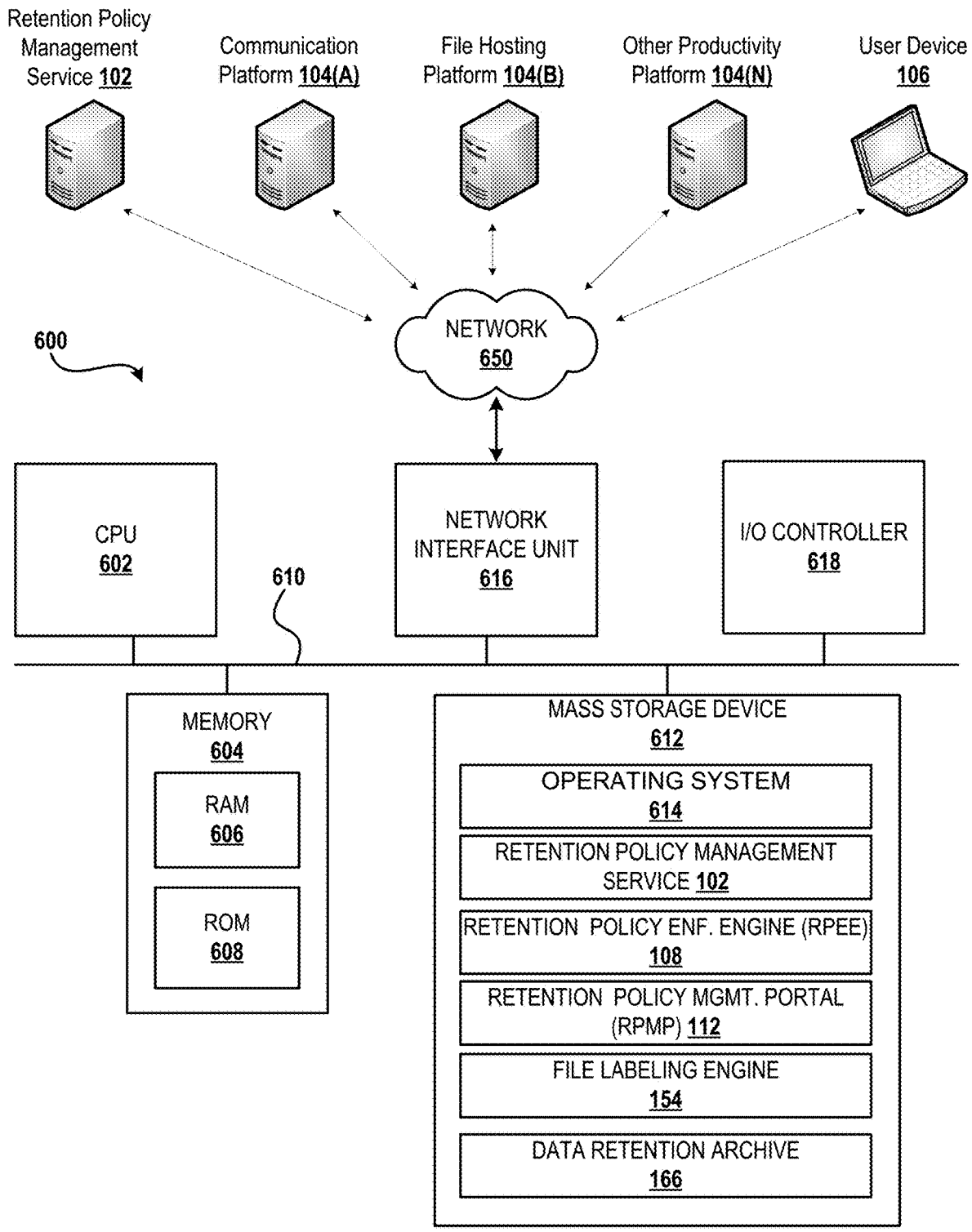

FIG. 6 shows additional details of an example computer architecture for a computer capable of executing the retention policy enforcement service and/or the retention policy enforcement engine, or any program components thereof as described herein.

DETAILED DESCRIPTION

The following Detailed Description describes techniques for providing a unified document retention management system that provides benefits over conventional document retention management systems by, for example, enabling a unified retention policy to be deployed across multiple productivity platforms from a single retention policy management portal (RPMP). Generally described, configurations disclosed herein enable a system to expose the RPMP to enable a user to selectively prescribe a unified retention policy to multiple productivity platforms and, ultimately, to deploy the unified retention policy across user selected productivity platforms. As described above, using a single RPMP to deploy a unified retention policy across multiple productivity platforms provides benefits over developing and managing duplicative data retention rules using existing data retention rule schemes that are limited to individual productivity platforms. To illustrate, suppose that a government mandated regulation (e.g. an Internal Revenue Service regulation) associated with a particular class of files such as, for example, tax related files is modified such that a minimum retention period assigned to this particular class of files is changed. Under these circumstances, the techniques disclosed herein enable a retention policy administrator to modify a unified retention policy and simultaneously prescribe this single policy to multiple productivity platforms. Furthermore, the techniques disclosed herein enable the retention policy administrator to quickly enforce modifications to the unified retention policy even when an organization's information workers are wholly unaware of such modifications.

For illustrative purposes, suppose that without the knowledge of an information worker corresponding to a particular email account and a particular file hosting account, a retention policy administrator modifies the unified retention policy to prescribe that tax related documents are retained for exactly seven years and then are immediately destroyed. Further suppose that there is at least one tax related email in the particular email account and at least one tax related workbook in the particular file hosting account (e.g. at least one email and at least one workbook are each labeled as a "Tax Record" with metadata). In such a case, techniques described herein enable the retention policy administrator to utilize the RPMP to simultaneously prescribe modifications of the unified retention policy across both the information worker's particular email account and particular file hosting account. Then, the unified retention policy can be enforced with respect to each of the particular email account and the particular file hosting account to prevent the information worker from deleting tax related documents up until the system automatically deletes these tax related documents upon these documents reaching the specified retention age threshold, e.g. seven years. Furthermore, as will be described in more detail below, in some implementations the system is configured to automatically identify and label these tax related documents with the "Tax Record" label without manual input from the information worker. Accordingly, techniques described herein enable a retention policy administrator to efficiently enforce a unified retention policy across an entire organization with little or no reliance on information workers to analyze individual files with respect to and/or even apprise themselves of the unified retention policy.

As used herein, the term "information worker" refers generally to those individuals within an organization that are responsible for generating, reviewing, signing-off on, or otherwise interacting with files that are affected by the unified retention policy. As used herein, the term "retention policy administrator" refers generally to an individual within an organization that is responsible, in whole or in part, for generating and/or reviewing the unified retention policy. The terms "information worker" and "retention policy administrator" and "user" are not mutually exclusive, e.g. a single person may in some instances be both an information worker and a retention policy administrator.

Figure 1A:
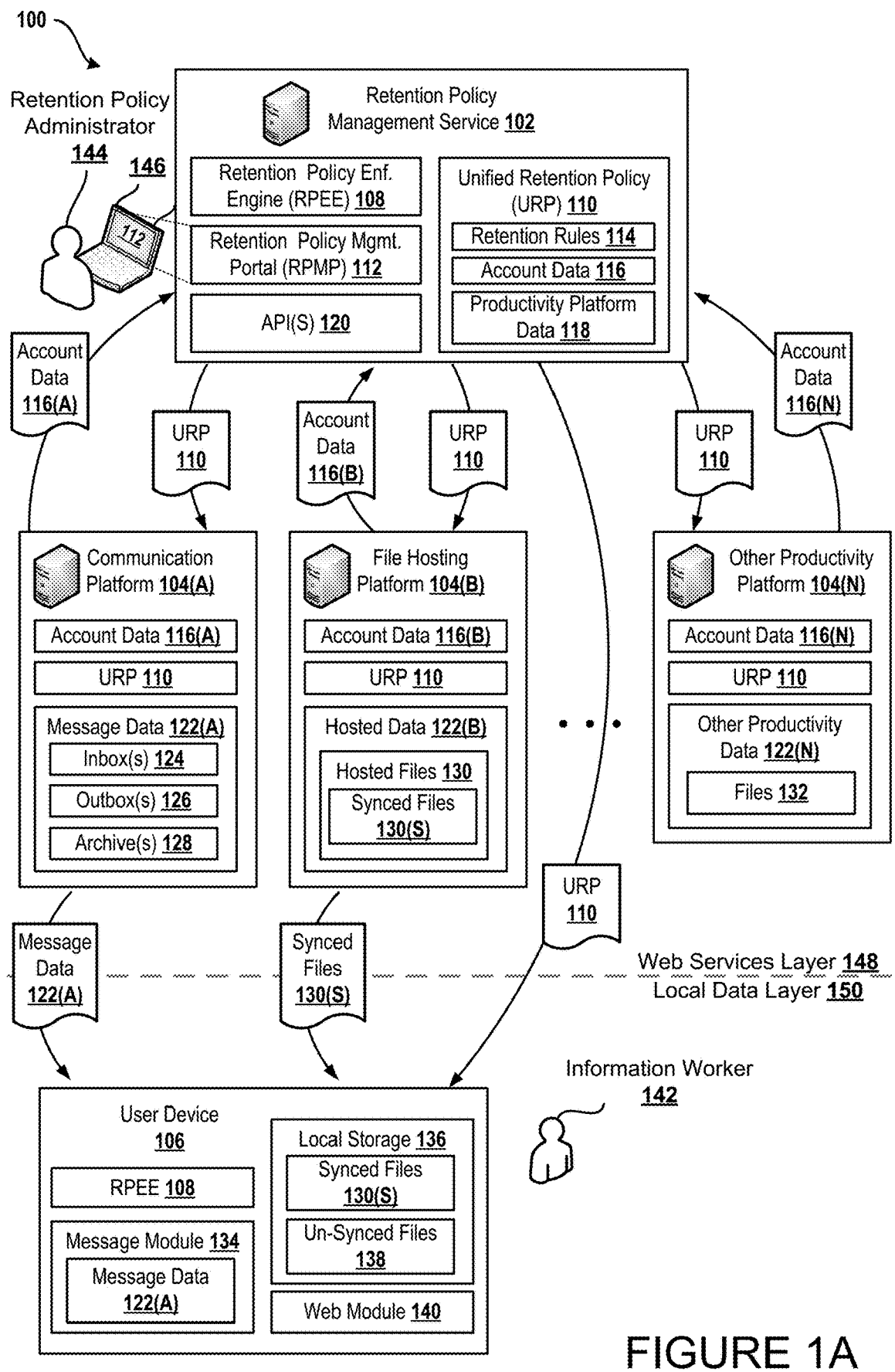
FIG. 1A illustrates an example data flow scenario of a system that deploys a unified retention policy across multiple productivity platforms by leveraging retention policy enforcement capabilities that are built into individual ones of the multiple productivity platforms.
Figure 1B:
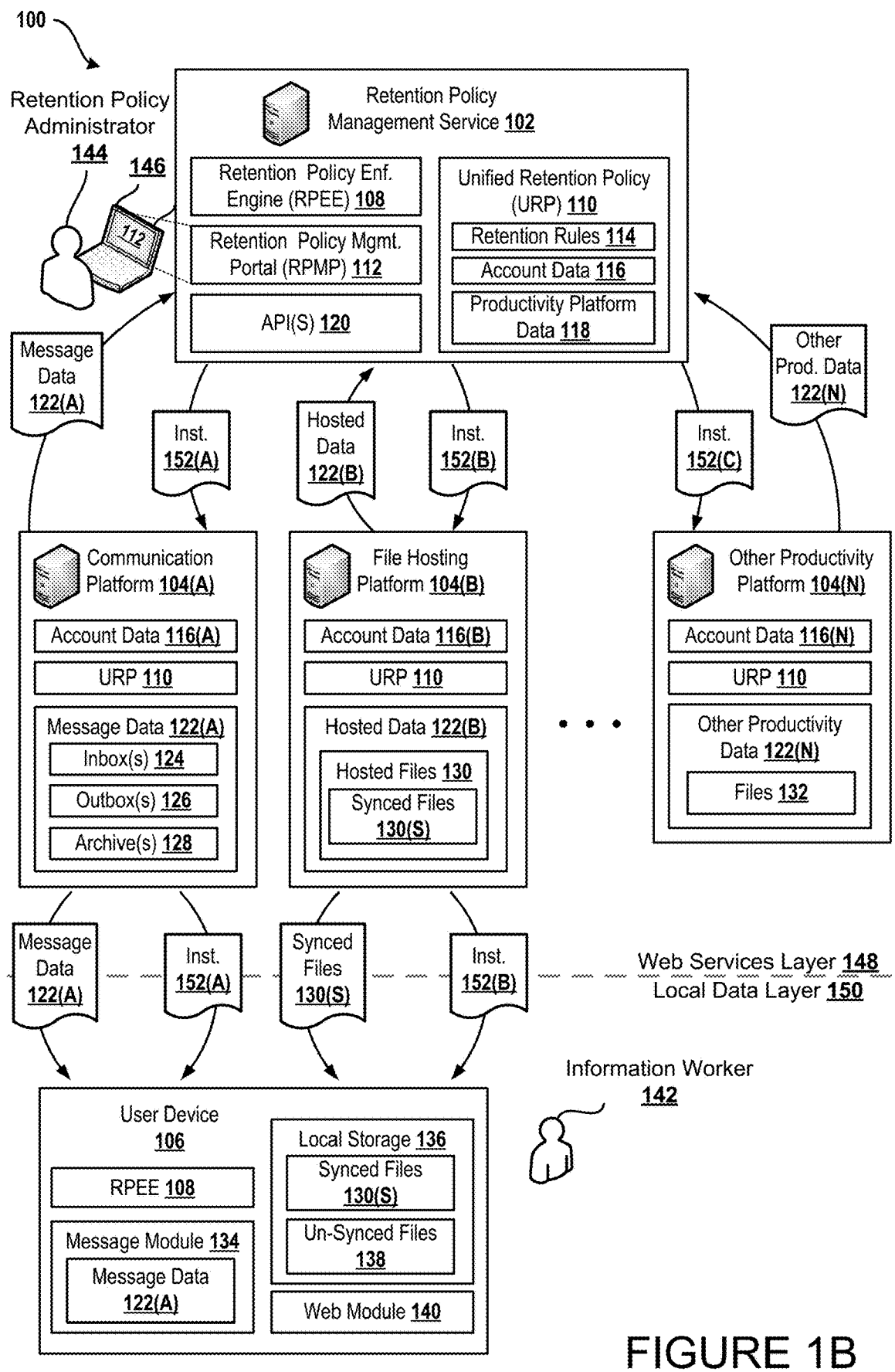
FIG. 1B illustrates an example data flow scenario of a system that deploys a unified retention policy across multiple productivity platforms by analyzing data corresponding to individual productivity platforms and then instructing the individual productivity platforms to perform various actions in accordance with the unified retention policy.
Figure 1C:
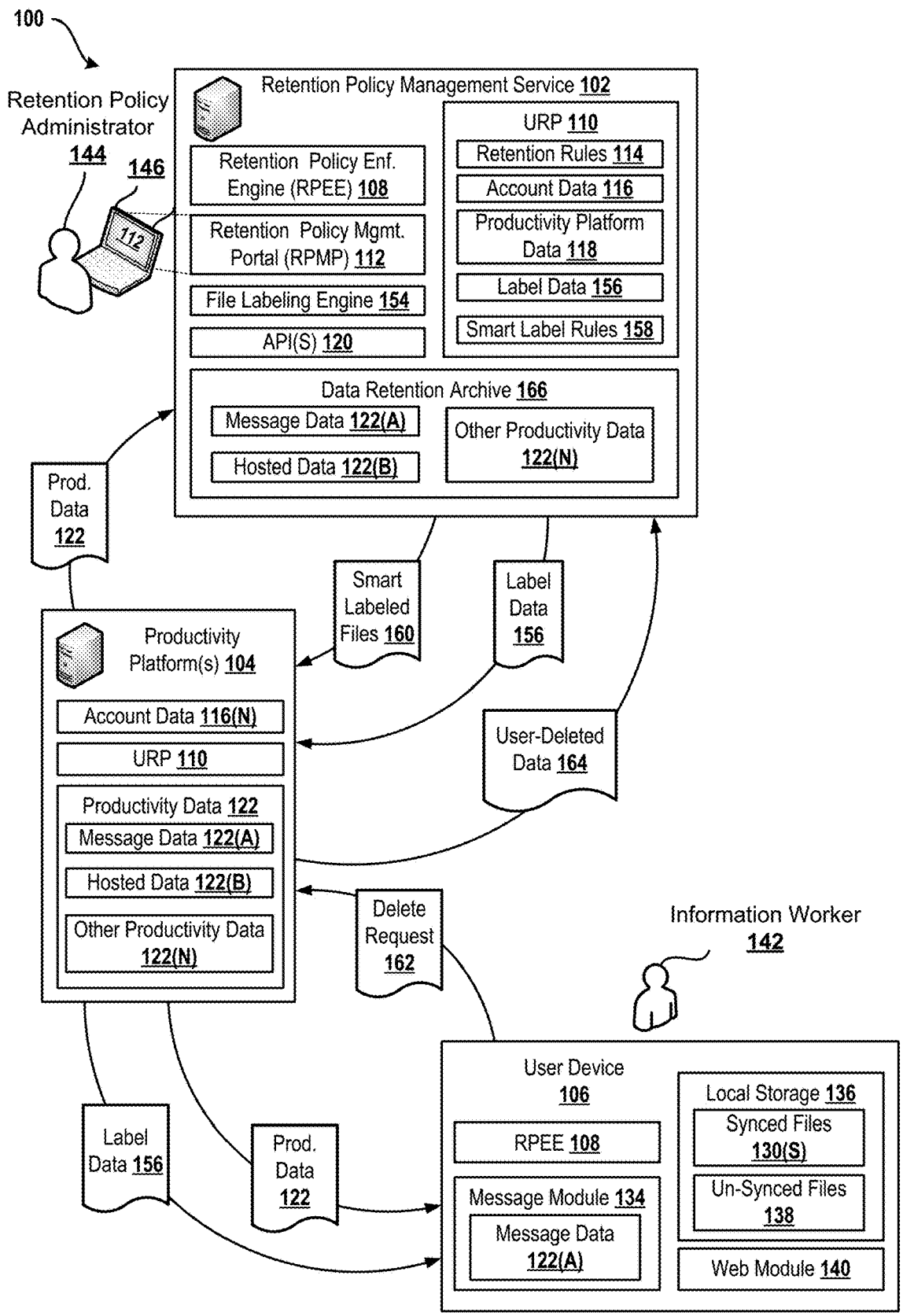
FIG. 1C illustrates an example data flow scenario of a system that includes a file labeling engine to enable users to manually label files stored on one or more productivity platforms, automatically analyze and label files based on file characteristics, or both.

To illustrate aspects of the techniques disclosed herein: FIGS. 1A-1B illustrate various data flow scenarios of systems that deploy a unified retention policy across multiple productivity platforms; and FIG. 1C illustrates a data flow scenario of a system that automatically analyzes and labels certain classes of files stored in association with one or more productivity platforms. Similar to other illustrations described herein, it can be appreciated that operations and/or functionalities may be described according to a logical flow of data between various components. The order in which these operations and/or functionalities are described and/or illustrated herein is not intended to be construed as a limitation. Rather, any number of the operations and/or functionalities described with respect to any one of FIGS. 1A-1C, may be combined in any order and/or in parallel in accordance with the present disclosure. Other processes and/or operations and/or functionalities described throughout this disclosure shall be interpreted accordingly.

Turning now to FIG. 1A, an example data flow scenario is illustrated with respect to a system 100 that deploys a unified retention policy across multiple productivity platforms by leveraging retention policy enforcement capabilities that are built into individual ones of the multiple productivity platforms. As used herein, the term "productivity platform" refers to local and/or web-based software that is dedicated to producing, modifying, and/or accessing information such as, for example, email, live chat sessions, word processing documents, presentations, workbooks (a.k.a. "worksheets"), and/or Internet/Intranet share sites. Exemplary productivity platforms include, but are not limited to, communication platforms (e.g. email services, instant messaging services, on-line video chat services, etc.) and file hosting platforms (e.g. personal cloud based storage, online file sharing services). Furthermore, in some implementations, the individual productivity platforms may be components of a productivity suite (e.g. GOOGLE G-SUITE, ZOHO Office Suite, or MICROSOFT OFFICE 365) such that a single set of user credentials may be issued to provision a user with access to a plurality of different productivity platforms. As illustrated, the system 100 may include a retention policy management service 102 that may transmit a unified retention policy to multiple productivity platforms 104. The system 100 may further include a user device 106 through which an information worker may access the multiple productivity platforms 104. As illustrated in FIG. 1A, exemplary productivity platforms may include, but are not limited to, a communication platform 104(A), a file hosting platform 104(B), and any other type of productivity platform 104(N). In some instances, the file hosting platform 104(B) may be configured to enable a user to open, view, edit, create, save, copy, or otherwise manipulate files such as, for example, text documents, spreadsheet documents, and/or presentation documents. An exemplary file hosting platforms include, but are not limited to, MICROSOFT WORD ONLINE, MICROSOFT EXCEL ONLINE, MICROSOFT POWERPOINT ONLINE, MICROSOFT ONEDRIVE, GOOGLE DOCS, GOOGLE SHEETS, GOOGLE SLIDES, and/or GOOGLE DRIVE.

The retention policy management service 102 may include a retention policy enforcement engine (RPEE) 108 that is configured to enforce a unified retention policy (URP) 110 across one or more of the productivity platforms 104. The unified retention policy 110 may include, but is not limited to, one or more data retention rules 114 that define various actions to be performed with respect to files that satisfy one or more predefined conditions. For example, the unified retention policy 110 may expressly prescribe a retention age threshold for files that are determined to be tax related, e.g. based on a label or otherwise. Under these circumstances, the retention policy enforcement engine 108 may enforce the unified retention policy 110 across the communication platform 104(A) and the file hosting platform 104(B) by identifying (and/or causing the communication platform 104(A) and the file hosting platform 104(B) to identify) tax related documents. The system 100 may then automatically purge these documents from data storage associated with the productivity platforms 104 as individual ones of the tax related documents reach the predefined retention age threshold.

The retention policy management service 102 may be configured to expose a retention policy management portal (RPMP) 112 to enable an administrator to prescribe the unified retention policy 110 to individual ones of the productivity platforms 104 and/or individual user accounts. The unified retention policy 110 may further include account data 116 that is associated with productivity platform user accounts assigned to individual and/or groups of information workers. For example, the organization may provision information workers with access to one or more of the productivity platforms 104 by assigning the information workers with unique credentials that can be used to sign-into associated productivity platform user accounts.

The unified retention policy 110 may further include productivity platform data 118 that is associated with individual ones of the multiple productivity platforms 104. For example, the productivity platform data 118 may indicate system parameters corresponding to the communication platform 104(A) as well as system parameters corresponding to the file hosting platform 104(B). Exemplary system parameters include, but are not limited to, one or more file types that are associated with an individual productivity platform (e.g. a type of email file that the communication platform 104(A) is configured to send or receive), instructions that enable the system to navigate an organizational scheme of the productivity platforms, or instructions that enable the system to analyze different data file types that are associated with various productivity platforms.

The retention policy management service 102 may further include one or more application programming interfaces (API) 120 that expose an interface through which the retention policy management service 102 can send data to and/or receive data from the productivity platforms 104 and/or the user device 106. Through the use of this data interface and other interfaces, the devices and services described herein can communicate and process data in such a manner as to enable the functionality and/or operations disclosed herein.

The productivity platforms 104 may include productivity data 122 that includes a plurality of files that are scattered across the productivity platforms 104 and which are potentially subject to one or more retention rules 114 of the unified retention policy 110. For example, the communication platform 104(A) may include message data 122(A) associated with an email or other type of communication account whereas the file hosting platform 104(B) may include hosted data 122(B) corresponding to a cloud storage drive. For purposes of the present discussion, assume that the communication platform 104(A) includes message data 122(A) corresponding to one or more email inboxes 124, one or more email out boxes 126, and/or one or more archive folders 128. Further assume that the file hosting platform 104(B) includes hosted data 122(B) corresponding to one or more hosted files 130 which may include one or more synced files 130(S) (e.g. files that are synchronized between the user device 106 and a productivity platform 104), and that the other productivity platform 104(N) includes other productivity data 122(N) including one or more files 132 that are also potentially subject to the unified retention policy 110.

The user device 106 may also include the retention policy enforcement engine 108 (or a version thereof) that is configured to enforce the unified retention policy 110 with respect to portions of the productivity data 122 that are stored locally at the user device 106. For example, the retention policy enforcement engine 108 may be configured to access a message module 134 to analyze locally stored portions of the message data 122(A), and also to access local storage 136 of the user device 106 to analyze the synced files 130(S) and/or the plurality of un-synced files 138 (e.g. files that are stored locally on the user device 106 and are not synchronized with a productivity platform 104). The user device 106 may further include a web module 140 through which an information worker 142 can access individual ones of the productivity platforms 104. For example, one or more of the productivity platforms 104 may include a web-based portal through which the information worker 142 can provide her organization assigned user credentials to obtain access to the productivity data 122 that is associated with her account.

With respect to the example data flow scenario of FIG. 1A, the retention policy management service 102 is shown to obtain account data 116 corresponding to user accounts that are provisioned with access to the productivity platforms 104. In some implementations, various portions of the account data 116 may correspond to individual productivity platforms 104. For example, the account data 116 may be comprised of account data 116(A) that corresponds to the communication platform 104(A), account data 116(B) that corresponds to the file hosting platform 104(B), and so on. Exemplary account data includes, but is not limited to, user credentials associated with the information worker 142, and account settings corresponding to a user account of the information worker 142. In some implementations, the account data 116(A) and the account data 116(B) may share similar user credentials data while having at least partially divergent account settings data. For example, the same user credentials may provision the information worker 142 with access to each of the communication platform 104(A) and the file hosting platform 104(B) but the information worker 142 may have customized her account settings with respect to one or both of the communication platform 104(A) and the file hosting platform 104(B). Although as illustrated, the retention policy management service 102 is shown to receive the account data 116(A)-116(N) from the corresponding productivity platforms 104(A)-104(N), it can be appreciated that the account data 116 may be obtained from alternate sources such as, for example, an administrative database.

The retention policy management service 102 may expose the RPMP 112 to enable a retention policy administrator 144 to view and/or modify the unified retention policy 110 in general and/or as related to specific user accounts. For example, the RPMP 112 may be configured to cause a computing device 146 to display various aspects of the unified retention policy 110 such as, for example, the data retention rules 114, the account data 116, and/or the productivity platform data 118. The RPMP 112 may further be configured to enable the retention policy administrator 144 to create new and/or modify existing data retention rules 114. Through the RPMP 112, the retention policy administrator 144 may define a particular retention rule that includes at least one condition and at least one action to be performed with respect to files that satisfy the at least one condition. Exemplary conditions include, but are not limited to, reaching and/or exceeding a retention age threshold as measured from a date of creation of a particular file, reaching and/or exceeding a retention age threshold as measured from a date that a particular file was last modified, being manually tagged by a user with a label (e.g. a "Tax Record" label indicating that a particular file is tax related), and/or being automatically tagged by the system 100 with a label. Exemplary actions to be performed with respect to files that satisfy one or more conditions include, but are not limited to, forcibly retaining a particular file within system storage (e.g. preventing a user from deleting the file), moving a particular file to an archive, purging a particular file from system storage, preventing a particular file from being displayed to the information worker 142 via one or more of the productivity platforms 104, preventing a particular file from being modified by the information worker 142, and/or prompting a user (e.g. the retention policy administrator 144 and/or the information worker 142) to indicate whether to retain and/or purge a particular file. Exemplary data retention rules include, but are not limited to, automatically purging a particular file from storage associated with the productivity platforms 104 based on the particular file reaching or exceeding the retention age threshold, forcibly retaining a particular file in storage associated with the productivity platforms 104 (and/or a data retention archive) based on the particular file not reaching the retention age threshold, and/or prompting a user to adjudicate whether to delete or retain a particular file upon that file reaching the retention age threshold.

The RPMP 112 may also enable the retention policy administrator 144 to prescribe the unified retention policy 110 across multiple ones of the productivity platforms 104. Although as illustrated, the retention policy management service 102 is shown to transmit the unified retention policy 110 to each of the communication platform 104(A), the file hosting platform 104(B), and the other productivity platform 104(N), in some implementations the RPMP 112 may enable the retention policy administrator to prescribe the unified retention policy 110 to some but not all of the productivity platforms 104. For example, in some implementations, the retention policy administrator 144 may utilize the RPMP 112 to prescribe the unified retention policy 110 across multiple ones of the productivity platforms 104 while excluding one or more individual productivity platforms 104 from all or part of the unified retention policy 110. For example, via the RPMP 112, the retention policy administrator 144 may modify parameters to prescribe the unified retention policy 110 to all productivity platforms 104 by default while further modifying parameters to override the default by excluding selected ones of the productivity platforms 104.

In some implementations, default parameters of the unified retention policy 110 may prescribe the unified retention policy 110 to a predefined subset of the productivity platforms 104. For example, an organization may elect for a particular form of communication to be transitory and, therefore, elect not to save messages transmitted via this particular form of communication. To illustrate, suppose that the communication platform 104(A) corresponds to an email service (e.g. MICROSOFT OUTLOOK, GMAIL, etc.) and the other productivity platform 104(N) corresponds to a video conferencing service (e.g. SKYPE, GOOGLE HANGOUTS). Here, an organization may elect to deploy the unified retention policy with respect to the email service but refrain from retaining any communications associated with the video conferencing service. Under these circumstances, the organization may set parameters of the system 100 that by default prescribe the unified retention policy 110 to the email service while excluding the video conferencing service from the unified retention policy 110.

In some implementations, the RPMP 112 may also enable the retention policy administrator 144 to selectively prescribe the unified retention policy 110, in whole or in part, to user accounts on an individual and/or group basis. For example, a version of the unified retention policy 110 may be created with respect to an accounting team of an organization and the RPMP 112 may enable the retention policy administrator 144 to seamlessly prescribe this version of the unified retention policy 110 to the accounting team as a whole rather than having to select each individual member of the accounting team. As another example, the retention policy administrator 144 may generate one or more data retention rules 114 to be uniquely prescribed to one or more user accounts on an individual basis. As a more specific, but nonlimiting example, the unified retention policy 110 may by default cause all tax related files to be automatically purged from the system 100 across all of the productivity platforms 104 upon these tax related files reaching a predetermined retention age threshold. However, the retention policy administrator 144 may modify the default system parameters with respect to one or more specific information workers (e.g. an executive level organization employee such as a Chief Financial Officer) to prompt a user to adjudicate whether to delete or retain any of this specific information worker's tax related files that reach the retention age threshold.

In some implementations, the RPMP 112 may enable the retention policy administrator 144 to selectively exclude individual communication platform user accounts from a portion of the unified retention policy 110 and/or the entire unified retention policy 110. For example, the system 100 may obtain organization account data that corresponds to user accounts that are provisioned by the organization with access to two or more productivity platforms. To illustrate, suppose that the organization account data includes information associated with a particular user account that is provisioned by the organization with access to the file hosting platform 104(B). Stated alternatively, the particular user is provisioned with two accounts (which may share common user credentials) where account "A" corresponds to the communication platform 104(A) and account "B" corresponds to the file hosting platform 104(B). Under these circumstances, the RPMP 112 may enable the retention policy administrator to select either account "A" or account "B" (or both for that matter) to be excluded in whole or in part from the unified retention policy. Then, based on the retention policy administrator's selected account exclusions, the system 100 may exclude account "A" and/or account "B" from the unified retention policy 110.

Based on instructions generated by the retention policy administrator 144 via the RPMP 112, the system 100 may deploy the unified retention policy 110 across one or more of the productivity platforms 104. For example, in the implementation illustrated in FIG. 1A, the retention policy management service 102 is shown to transmit the unified retention policy 110 to individual productivity platforms 104 to cause the individual productivity platforms to enforce the unified retention policy 110. For example, the system 100 may leverage retention policy enforcement capabilities that are built into individual ones of the multiple productivity platforms 104. Under these circumstances, the system 100 may automatically modify retention policy settings of the individual productivity platforms 104 based on the unified retention policy 110. Then, the individual productivity platforms 104 may analyze data corresponding to one or more user accounts to identify files that satisfy various conditions of the unified retention policy 110 and, in particular, individual data retention rules 114 thereof. Once the individual productivity platforms 104 identify sets of files that satisfy conditions of the unified retention policy 110, these individual productivity platforms 104 may then perform actions corresponding to applicable ones of the data retention rules 114.

To further illustrate these concepts, in the implementation illustrated in FIG. 1A, the communication platform 104(A) may analyze the message data 122(A) to identify one or more email files that satisfy conditions corresponding to one or more data retention rules 114, the file hosting platform 104(B) may analyze the hosted data 122(B) to identify one or more document and/or workbook files that satisfy conditions corresponding to one or more data retention rules 114, and so on. Then, the communication platform 104(A) may perform a corresponding action with respect to the one or more email files that satisfy conditions of a specific data retention rule, and the file hosting platform 104(B) may likewise perform this action with respect to the one or more document and/or workbook files that satisfy the conditions of a specific data retention rule.

As further illustrated in FIG. 1A, in some implementations, the unified retention policy 110 may be transmitted to the user device 106 to cause a local version of the retention policy enforcement engine 108 to enforce the unified retention policy 110 with respect to the message module 134 and/or the local storage 136. Although the user device 106 may include a web module 140 that can be used to access the productivity platforms 104 (e.g. by providing her credentials to the productivity platforms via a web browser), the user device 106 may also be configured to periodically synchronize local data with one or more of the communication platforms. For example, the message module 134 may be a local email client (MICROSOFT'S OUTLOOK, APPLE'S IOS MAIL) that is configured to provide non-web-based access to the information worker's user account for the communication platform 104(A). Accordingly, the message module 134 may store at least some of the message data 122(A) locally at the user device 106. Furthermore, the local storage 136 may be configured to periodically receive the synchronized files 130(S) from the file hosting platform 104(B) to enable the information worker 142 to access these synchronized files 130(S) without having to use the web module 140 to access the file hosting platform 104(B) via the web services layer 148. Accordingly, to mitigate a risk that enforcement of the unified retention policy 110 will be limited to the web services layer 148 while files that are subject to one or more retention rules 114 are mishandled locally at the user device 106, the local version of the policy enforcement engine 108 may be configured to locally enforce the unified retention policy 110 by analyzing any locally stored message data 122(A) and/or locally stored synchronized files 130(S). Various implementations of the system 100, therefore, may be configured to enforce the unified retention policy 110 both at a web services layer 148 (e.g. retaining and/or deleting files from one or more servers corresponding to the productivity platforms 104) as well as at a local data layer 150 (e.g. retaining and/or deleting files from a hard drive and/or cache of the user device 106).

In some implementations, the local version of the retention policy enforcement engine 108 may further be configured to analyze the unsynchronized files 138 on the local storage 136 to identify individual files that are subject to one or more data retention rules 114 and, ultimately, to enforce the unified retention policy 110 with respect to even these unsynchronized files 138. For example, the information worker 142 may utilize a portable storage device such as, for example, a USB drive to move some of the hosted files 130 (or any other organization data for that matter) to the local storage 136. Furthermore, these hosted files 130 may have been labeled automatically by the system 100 and/or manually by the information worker 142 as being tax related files. Under these circumstances, the system 100 may identify one or more of the unsynchronized files 138 that are affected by a particular data retention rule 114 and then perform a corresponding action with respect to these identified files.

Turning now to FIG. 1B, an example data flow scenario is illustrated where the system 100 deploys the unified retention policy 110 by causing the retention policy management service 102 to analyze data received from the productivity platforms 104 and then instructing the individual productivity platforms 104 to perform actions in accordance with the retention policy 110. It can be appreciated that the data flow scenario of FIG. 1A has much in common with the data flow scenario of FIG. 1B and, therefore, for brevity such similarities need not be discussed in detail with respect to FIG. 1B. For example, in each data flow scenario the system 100 may expose the RPMP 112 via the device 146 to enable the retention policy administrator 144 to prescribed the unified retention policy 110 across the various productivity platforms 104. Furthermore, individual ones of the productivity platforms 104 such as, for example, the communication platform 104(A) and the file hosting platform 104(B) may be configured to communicate with the user device 106. For example, the communication platform 104(A) may be configured to communicate with and/or transmit the message data 122(A) to the message module 134.

It can also be appreciated that there are several differences between these data flow scenarios. In particular, in the example dataflow scenario of FIG. 1B, individual productivity platforms 104 transmit productivity data 122 to the retention policy management service 102 and, based thereon, receive from the retention policy management service 102 instructions 152 indicating actions to perform with respect to various portions of the transmitted data. For example, the communication platform 104(A) is shown to transmit the message data 122(A) to the retention policy management service 102. As described above, the message data 122(A) may correspond to the information worker 142 email inbox(s) 124, email outbox(s) 126, and/or archive folder(s) 128. Upon receipt of the message data 122(A), the retention policy enforcement engine 108 may analyze the message data 122(A) with respect to the unified retention policy 110 to identify a plurality of files (e.g. email files and/or other files that are included in an email file as an attachment) that satisfy the condition(s) of individual data retention rules 114. Similarly, the file hosting platform 104(B) is shown to transmit the hosted data 122(B) to the retention policy management service 102 which then may analyze the hosted data 122(B) to identify another plurality of files that satisfy various conditions of the data retention rules 114.

Upon identifying one or more sets of files that are subject to various ones of the data retention rules 114, the retention policy management service 102 may then transmit instructions 152 to the individual productivity platforms 104 to cause actions corresponding to the various ones of the data retention rules 114 to be performed with respect to the one or more sets of files. For example, the retention policy enforcement engine 108 may analyze the message data 122(A) to identify a plurality of emails that have reached or exceeded a predefined retention age threshold, and may further analyze the hosted data 122(B) to identify a plurality of word processing documents and/or spreadsheet workbooks that have also reached or exceeded the predefined retention age threshold. Then, the retention policy enforcement engine 108 may transmit an instruction 152(A) to cause the communication platform 104(A) to purge the plurality of emails from the message data 122(A) while also transmitting an instruction 152(B) to cause the file hosting platform 104(B) to purge the plurality of word processing documents and/or spreadsheet workbooks from the hosted data 122(B).

In some implementations, individual productivity platforms 104 may be configured to transmit a subset of files, from their corresponding data, to the retention policy management service 102 based on certain events occurring with respect to individual ones of the subset of files. For example, upon the information worker 142 attempting to delete a particular message from her inbox 124, the communication platform 104(A) may be configured to transmit this particular message to the retention policy management service 102 and then wait to receive the instruction 152(A) before deleting the particular message. Then, in the event that the instruction 152(A) indicates that the information worker 142 is permitted to delete this particular message based on the unified retention policy 110, the communication platform 104(A) may permanently delete the particular message. On the other hand, in the event that the instruction 152(A) indicates that the information worker 142 is not permitted to delete this particular message, the communication platform 104(A) may retain the particular message and/or transmit the particular message to an archive.

In some implementations, the system 100 may further be configured so that individual productivity platforms 104 relay instructions 152 to the local version of the retention policy enforcement engine 108 at the user device 106 to enforce the unified retention policy 110 at the local data layer 150. For example, the instruction 152(A) may be transmitted to the user device 106 to cause the message module 134 to delete messages that have reached or exceeded a predefined retention age threshold. In various implementations, the local version of the retention policy enforcement engine 108 may be configured to scan the local storage 136 to identify locally stored copies of files corresponding to a particular instruction 152. For example, consider a scenario where the information worker 142 has used a local email client to manually drag an email message from the message module 134 to a non-synchronized folder contained within the local storage 136. Further suppose that the message module 134 lacks the capabilities to identify and/or perform actions with respect to the email message that has been copied to the local storage 136. Under these circumstances, the retention policy enforcement engine 108 may be configured to scan the local storage 136 to locate this email message in the local storage 136 and, ultimately, to cause the email message to be purged from the local storage 136.

Turning now to FIG. 1C, an example data flow scenario is illustrated where the system 100 further includes a file labeling engine 154 that is configured to provide label data 156 to the productivity platforms 104 and/or the user device 106. In some implementations, the label data 156 defines one or more labels that may be displayed at the user device 106 to enable the information worker 142 to manually tag individual files of the productivity data 122 with individual ones of the one or more labels. For example, the information worker may review email messages within the message data 122(A) and manually apply a "Tax Record" label to an individual email message. In some implementations, the information worker 142 may access the productivity platforms 104 via the web module 140 and manually tag individual files with the labels via a web portal user interface. That is, the information worker 142 may manually tag the individual files while accessing an online version of a productivity platform 104. In some implementations, the label data 156 may be transmitted to the user device 106 to enable the information worker 142 to manually tag individual files with the labels locally at the user device. For example, the message module 134 may be an email client (e.g. MICROSOFT OUTLOOK) that, upon receipt of the label data 156, enables the information worker 142 to locally label individual email messages. In some implementations, the message module 134 may be configured to synchronize with the productivity platform 104 to cause labels placed on individual files via the message module 134 to also be placed on those files within the productivity data 122 as stored at the productivity platform 104. For example, based on these techniques, a file labeled as "Tax Record" within the message module 134 would eventually be synchronized with the productivity platform 104 such that it is also file labeled as "Tax Record" when viewed via a web-based version of the productivity platform 104.

In some implementations, the label data 156 includes a plurality of sets of labels and the RPMP 112 is configured to enable the retention policy administrator 144 to selectively cause individual sets of labels to be displayed on an individual user basis and/or a user group basis. For example, in various implementations, the RPMP 112 may enable the retention policy administrator 144 to define a set of accounting related labels as well as a set of legal related labels and, ultimately, to selectively cause the set of accounting related labels to be displayed to members of an accounting team and also to selectively cause the set of legal related labels to be displayed to members of a legal team. Accordingly, the retention policy administrator 144 can prevent the information worker 142 from having to sift through large numbers of predefined labels which are irrelevant to her work responsibilities while still providing her access to those labels which are potentially relevant to files she is performing work with so that she may manually tag individual files as appropriate.

In some implementations, the system 100 is configured to analyze the productivity data 122 with respect to smart label rules 158 to automatically label individual files without manual input from the information worker 142. For example, the file labeling engine 154 may be configured to receive the productivity data 122 and analyze individual files within the productivity data 122 with respect to the smart label rules 158 to determine whether any individual files satisfy one or more of the smart label rules 158. Exemplary smart label rules 158 include, but are not limited to, rules that search for individual files that contain one or more predefined types of sensitive information, positively match a user-defined search query, correspond to a predefined document fingerprint, or any combination thereof. Then, once the system 100 has identified individual files that satisfy one or more smart label rules 158, the system 100 may automatically apply corresponding labels to the individual files to define smart labeled files 160 that may then be transmitted to the productivity platforms 104. In some implementations, a particular file that has been labeled as a smart labeled file may be displayed to the information worker 142 along with an indication that this particular file has been automatically labeled according to one or more of the smart label rules 158. For example, suppose that the productivity data 122 that is sent to the file labeling engine 154 contains an individual email that includes an IRS tax form as an attachment. Further suppose that an individual smart label rule 158 has been designed by the retention policy administrator 144 to identify IRS tax forms and to label these forms (and/or communications containing these forms such as the email of the present scenario) with a "Tax Record" label. Under these circumstances, the system 100 may identify that this individual email includes the IRS tax form and, based thereon, the system may apply the "Tax Record" label to this individual email. To further illustrate these concepts, this description will turn to FIGS. 2-4 before turning back to FIG. 1C.

Turning now to FIG. 2, aspects are illustrated of a user interface (UI) 200 corresponding to the RPMP 112 that can be displayed on the device 146 to enable the retention policy administrator 144 to define a smart label rule 158 based on one or more predefined conditions that are built into the system 100 and/or by defining a custom search query. In the illustrated scenario, the retention policy administrator 144 is defining a smart label rule 158 to label individual files with a "Tax Record" label. For example, as illustrated, the retention policy administrator has indicated that she would like to apply this label to documents that are sent within a predefined date range (i.e. Dec. 1, 2016-Jan. 15, 2017) and are sent by members of a predefined accounting team. Exemplary predefined conditions include, but are not limited to, a date that a file was transmitted, a date that a file was received, a date that a file was created, a date that a file was modified, a sender email address, a recipient email address, a text string of a subject line of an email, or any other condition or combination of conditions deemed relevant by the retention policy administrator 144.

It can be appreciated that members of the accounting team might send and/or receive emails within this predefined date range that are wholly unrelated to taxes. For example, the information worker 142 may have been assigned to assist an organization in preparing tax documents but may also have various work responsibilities that are unrelated to preparing tax documents. Furthermore, the information worker 142 may use her organization assigned email for at least some personal reasons. Accordingly, there may be many files and/or emails sent during this predefined date range that should not be labeled as a "Tax Record." Under these circumstances, it can be appreciated that simply labeling any email sent during this predefined date range by any member of the accounting team may be over-inclusive and cause numerous non-tax related files to be labeled as a "Tax Record." With respect to this concern, the retention policy administrator 144 has defined a search query to be performed against individual files to limit the application of the "Tax Record" label to files containing at least one of a predefined set of terms. In particular, as illustrated only files that contain at least one of the terms "Tax*", or "Form 1099*", etc. will be automatically labeled as a "Tax Record" by the file labeling engine 154. Although any suitable search query language may be deployed to define smart label rules 158, exemplary search query languages include the Keyword Query Language (KQL) and the FAST Query Language (FQL) which are included in MICROSOFT SHAREPOINT.

In some implementations, the UI 200 may prompt the retention policy administrator 144 to indicate whether she would like to retain content by defining a minimum retention period, a retention age threshold, or an age at which files are to be automatically deleted. As illustrated, the retention policy administrator 144 has selected a radio button to prescribe a retention age threshold to the "Tax Record" label. Furthermore, the retention policy administrator 144 has set the retention age threshold to 7 years. By defining the retention age threshold of seven years, the retention policy administrator 144 is able to simultaneously prevent files that have been labeled as a "Tax Record" from being deleted and/or modified prior to that file reaching the retention age threshold while also instructing the system 100 to automatically delete such files once they reach the retention age threshold. As further illustrated, the UI 200 may also enable the retention policy administrator 144 to generate a rule to cause the system 100 to automatically delete content upon reaching a certain age without preventing the information worker 142 from deleting and/or modifying such content prior to the content reaching that certain age. Furthermore, the UI 200 may also enable the retention policy administrator 144 to generate a rule to cause the system 100 to prevent content from being deleted until it reaches a certain age without causing the system to automatically delete such content upon reaching that certain age.

Turning now to FIG. 3, aspects are illustrated of a UI 300 corresponding to the RPMP 112 that can be displayed on the device 146 to enable the retention policy administrator 144 to define a smart label rule to label files containing sensitive content types. The UI 300 is similar to the UI 200 with the exception that the retention policy administrator 144 has selected a radio button that enables her to associate sensitive content types with the smart label "Tax Record" rule. In the illustrated scenario, the retention policy administrator 144 has selected three sensitive content types to associate with the "Tax Record" label. In some implementations, the retention policy administrator 144 may positively associate sensitive content types with a label to cause documents that contain the selected sensitive content types to be tagged with the label. For example, according to the illustrated scenario, the system 100 may analyze the productivity data 122 to identify individual files that contain one or more of an Employer Identification Number (EIN), a U.S. Individual Taxpayer Identification Number (ITIN), or a U.S. Social Security Number (SSN). In some implementations, the retention policy administrator 144 may negatively associate sensitive content types with a label to prevent documents that contain the selected sensitive content types from being tagged with the label. For example, according to the illustrated scenario, the system 100 may analyze the productivity data 122 to identify individual files that contain a U.S. Driver's License Number to prevent these documents from being labeled as a tax record. Exemplary sensitive content types include, but are not limited to, bank routing numbers, bank account numbers, driver's license numbers, medical account numbers, passport numbers, tax file numbers, health service numbers, personal health identification numbers (PHIN), resident identity card numbers, and/or credit card numbers.

In various implementations, the system 100 may be configured to identify sensitive content types based on predefined patterns that can be identified based on a regular expression (REGEX) and/or function. For example, the system 100 may analyze numbers that are identified within files to determine whether these numbers correspond to a REGEX indicating that it is a credit card number. The system 100 may further be configured to identify and weigh corroborative evidence such as keywords and checksums to identify and/or validate sensitive content types. In various implementations, the system 100 may be configured to determine a confidence level associated with a finding of a sensitive content type and apply corresponding labels based on the confidence level reaching or exceeding the confidence threshold. For example, suppose that a smart label rule 158 has been defined to instruct the system 100 to label individual files as tax records in response to identifying an employer identification number with at least a 70% level of confidence.

Turning now to FIG. 4, aspects are illustrated of a UI 400 corresponding to the RPMP 112 that can be displayed on the device 146 to enable the retention policy administrator 144 to define a smart label rule based on a file matching a predefined document fingerprint. The UI 400 is similar to the UI 200 with the exception that the retention policy administrator 144 has selected a radio button that enables her to associate one or more document "Fingerprints" with the smart label "Tax Record" rule. In the illustrated scenario, the retention policy administrator 144 has selected an "IRS Tax Form" document fingerprint. As used herein, the term "document fingerprint" refers generally one or more predefined characteristics that correspond to a specific type and/or class of document. For example, it may be determined that a file having a header that contains the word "FORM W" followed by a number indicates a high likelihood of that file being an IRS tax form. As another example, it may further be determined that files containing the phrase "Privacy Act Notice" within some specified distance from the phrase "of the Internal Revenue Code" further indicates a high likelihood of that file being an IRS tax form. Accordingly, a document fingerprint may be defined within the smart label rules 158 to cause any individual file having these two predefined characteristics to be determined to match the "IRS Tax Form" document fingerprint and, ultimately, to be designated as an IRS tax form.

Referring back to FIG. 1C, in some implementations, the system 100 may be configured to analyze data corresponding to a delete request 162 to determine whether a particular file that the information worker 142 is attempting to delete has been tagged with a label that designates this particular file as a record that is required, under the unified retention policy 110, to be retained for at least a particular time and/or retained indefinitely. For example, upon a user attempting to delete a particular email that has been labeled with the "Tax Record" label, the system 100 may analyze this particular email to identify it as a tax record. Then, based on having identified the particular email as a tax record, the system 100 may prevent this file from being modified and/or deleted according to the unified policy 110. For example, the unified retention policy 110 may indicate to the information worker 142 that tax records are to be retained until they reach a retention age threshold. The unified retention policy 110 may further indicate that individual files are restricted from being modified once they are labeled as tax records. Under these circumstances, upon receiving the delete request 162 indicating that the information worker 142 has attempted to delete a particular file that is labeled as a tax record, the system 100 may prevent the particular file from being deleted (or modified for that matter) until the particular file reaches its corresponding predefined retention age threshold at which time the system 100 may automatically purge this particular file from the system 100 storage.

In some implementations, the system 100 may be configured to enable the information worker 142 to delete the particular file with respect to her productivity platform account but also to transfer the particular file, as user related data 164, to a data retention archive 166 in order to abide by the unified retention policy 110. Based on these techniques, the system 100 may give to the information worker 142 an appearance that a particular data file has been deleted even though that file has been archived for retention purposes. It can be appreciated that these techniques will benefit the information worker 142 by allowing her to organize (and/or decrease an amount of file-based clutter of) her productivity data 122. These techniques may further benefit the information worker when productivity platforms 104 have corresponding storage allotments assigned thereto for individual user accounts. For example, the information worker 142 may be assigned an email account that is provisioned with a limited storage allotment of, for example, a predefined number of megabytes. By permitting the information worker 142 to delete particular files from her account even when those files are subject to the unified retention policy 110, the system 100 mitigates difficulties associated with the information worker 142 running out of available storage within her storage allotment without impacting an organization's ability to abide by the unified retention policy 110.

To further illustrate these concepts, consider a scenario where the information worker 142 is allotted twenty-five megabytes (MB) of storage in an email account corresponding to the communication platform 104(A). Further consider that the information worker 142 receives a large email file that has been labeled as a tax record that has been assigned a particular retention age threshold (e.g. seven years) and that the information worker 142 attempts to delete this large email file from her email account due to its large size. Under these circumstances, the system 100 may receive a request to delete this email file from the information worker's user account and, based thereon, cause the large email file to be removed from her email account's twenty-five MB storage allotment. Furthermore, based on a determination that the email has yet to reach the retention age threshold, the system may cause the email file to be archived in the data retention archive 166 at least until the email file reaches the predefined retention age threshold. Then, the system may later determine that the email file has reached the predefined retention age threshold and as a result purge the email file from the data retention archive 166.

FIG. 5 is a flow diagram of an illustrative process 500 to prevent a particular file from being deleted when the particular file has not reached a predefined retention age threshold and then automatically purging the particular file from a user account when the particular file does eventually reach the predefined retention age threshold. The process 500 is described with reference to FIGS. 1A-4. The process 500 is illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform or implement particular functions. The order in which operations are described is not intended to be construed as a limitation, and any number of the described blocks can be combined in any order and/or in parallel to implement the process. Other processes described throughout this disclosure shall be interpreted accordingly.

At block 501, a system may receive an instruction to prescribe a retention policy to a user account that corresponds to at least one productivity platform. In various instances, the instruction may be received via a retention policy management portal (RPMP) 112 that enables a retention policy administrator 144 to selectively assign the retention policy to a user account on an individual productivity platform basis. For example, a particular user may be assigned user credentials associated with a user account that enable this particular user to sign in to this user account on both a first productivity platform and a second productivity platform. Under these circumstances, the RPMP 112 may enable the retention policy administrator 144 to prescribe the retention policy to the user account with respect to only the first productivity platform, only the second productivity platform, or both the first productivity platform and the second productivity platform. It is worth noting that as used herein, the term "retention policy" differs from the term "unified retention policy" in the sense that a retention policy is not necessarily configured to be deployed across multiple productivity platforms. Accordingly, it can be appreciated that a "unified retention policy" is also a "retention policy," whereas a "retention policy" is not necessarily a "unified retention policy." Stated alternatively, unified retention policies can be considered a class or type of retention policy. In various instances, the retention policy may associate a predetermined label with a retention age threshold such that individual files that are labeled with the predetermined label are subject to the retention age threshold.

At block 503, the system may receive a request to delete a particular file from the user account that corresponds to the at least one productivity platform. For example, an information worker 142 may sign into the first productivity platform using credentials associated with her user account. Then, she may select a particular file associated with the first productivity platform and instruct the system to delete this particular file. As a more specific, but nonlimiting example, the information worker 142 may sign into an email account using her user credentials and attempt to delete a specific email message from this email account.

At block 505, the system may determine that the predetermined label of the retention policy has been associated with the particular file for which the information worker 142 is requesting deletion. In some implementations, the system may analyze the particular file in response to the request received at block 503 and then, make a determination whether to associate the predetermined label with the particular file. For example, the system may analyze the particular file with respect to various conditions of the retention policy to determine whether any individual data retention rules apply to the particular file. Then, in the event that an individual data retention rule is designed to associate individual files with the predetermined label when those individual files satisfy a particular set of predetermined conditions, and the system makes a determination that the particular file satisfies this particular set of predetermined conditions, the system may associate the predetermined label with the particular file. In some implementations, the system may analyze the particular file at some point in time prior to receiving the request to delete the particular file at block 503. For example, the system may periodically scan through data storage associated with the first productivity platform and/or the second productivity platform to identify and label individual files that satisfy predetermined conditions corresponding to individual data retention rules. In some implementations, the system may rely on the information worker 142 to manually apply labels to individual files. For example, the system may periodically prompt the information worker to apply labels to emails within an email account. Under these circumstances, at some point in time prior to block 503, the information worker 142 may have manually labeled the particular file with the predetermined label, e.g. the information worker 142 may have labeled the particular file with a "Tax Record" label upon initial receipt of the particular file.

At block 507, the system may make a determination that the particular file has not reached a retention age threshold associated with the predetermined label. For example, continuing with the previous example, the particular file may be labeled with the "Tax Record" label which is associated with a predetermined retention age threshold of, for example, seven years. Accordingly, at block 507 the system may make a determination that the particular file was created and/or modified less than seven years ago.

At block 509, based on a determination that the particular file was created and/or modified less than seven years ago, the system may prevent the particular file from being deleted in accordance with the request received at block 503 to delete the particular file. In some implementations, the system may be configured to inform the information worker 142 that she is not permitted to delete the particular file in accordance with the retention policy. For example, the system may expose an informational pop-up window to inform the information worker that the particular file has been labeled as a "Tax Record" and that, therefore, the particular file must be retained and then deleted according to the predetermined retention age threshold. In some implementations, the system may be configured to provide the information worker 142 with an opportunity to the de-associate the label from the particular file. For example, the information worker 142 may be enabled to reassess whether or not the particular file is in fact a "Tax Record." Then, in the event that she makes a determination that the particular file is not a "Tax Record" she may de-label the particular file to gain the ability to then delete the particular file. In some implementations, preventing the particular file from being deleted at block 509 includes transferring the particular file from the user account to the data retention archive. For example, the particular file may be stored in the data retention archive for compliance purposes while having been removed from the user account. Accordingly, the particular file may in some instances no longer be accessible via the user account and furthermore may no longer count against a limited storage allotment corresponding to the user account.

At block 511, the system may make a determination that the particular file has reached the predetermined retention age threshold. For example, the determination at block 511 may occur subsequent to passage of the predetermined period of time required to satisfy the required retention age threshold.

Then, at block 513 the system may automatically purge the particular file from at least one storage device in accordance with the system's determination that the particular file has satisfied the predetermined retention age threshold. For example, in a scenario where the particular file has been retained within the user account storage, the system may purge this user account storage of the particular file automatically, with or without informing the information worker 142 of the file deletion. Furthermore, in a scenario where the particular file has been retained within the data retention archive, the system may automatically purge the data retention archive of the particular file. In some implementations, the system may be configured to scan one or more storage devices to identify stray copies of the particular file and, ultimately, to purge even these stray copies of the particular file from storage devices such as, for example, the data retention archive, one or more servers associated with the productivity platforms, and even local storage of a client device. For example, suppose that the information worker 142 had at some point manually dragged the particular file to a desktop of her user device from a message module configured to operate on her user device. Upon dragging the particular file to the desktop, it can be appreciated that the information worker has created a stray copy of the particular file in the sense that this copy of the particular file is no longer stored in a location that is typically associated with the message module and/or productivity platform. Under these circumstances, based on the determination of block 511 that the particular file has reached the predetermined retention age threshold, the system may be configured to scan one or more predefined storage locations such as, for example, the local storage 136 to find and destroy any stray copies of the particular file.

FIG. 6 shows additional details of an example computer architecture 600 for a computer capable of executing the retention policy management service 102, the communication platform 104(A), the file hosting platform 104(B), the other productivity platform 104(N), and/or any program components thereof as described herein. Thus, the computer architecture 600 illustrated in FIG. 6 illustrates an architecture for a server computer, or network of server computers, or any other types of computing devices suitable for implementing the functionality described herein. The computer architecture 600 may be utilized to execute any aspects of the software components presented herein.

The computer architecture 600 illustrated in FIG. 6 includes a central processing unit 602 ("CPU"), a system memory 604, including a random-access memory 606 ("RAM") and a read-only memory ("ROM") 608, and a system bus 610 that couples the memory 604 to the CPU 602. A basic input/output system containing the basic routines that help to transfer information between elements within the computer architecture 600, such as during startup, is stored in the ROM 608. The computer architecture 600 further includes a mass storage device 612 for storing an operating system 614, other data, and one or more application programs. The mass storage device 612 may further include one or more of the retention policy management service 102, the retention policy enforcement engine (RPEE) 108, the retention policy management portal (RPMP) 112, the file labeling engine 154, and/or the data retention archive 166.

The mass storage device 612 is connected to the CPU 602 through a mass storage controller (not shown) connected to the bus 610. The mass storage device 612 and its associated computer-readable media provide non-volatile storage for the computer architecture 600. Although the description of computer-readable media contained herein refers to a mass storage device, such as a solid-state drive, a hard disk or CD-ROM drive, it should be appreciated by those skilled in the art that computer-readable media can be any available computer storage media or communication media that can be accessed by the computer architecture 600.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 600. For purposes of the claims, the phrase "computer storage medium," "computer-readable storage medium" and variations thereof, does not include waves, signals, and/or other transitory and/or intangible communication media, per se.

According to various techniques, the computer architecture 600 may operate in a networked environment using logical connections to remote computers through a network 650 and/or another network (not shown). The computer architecture 600 may connect to the network 650 through a network interface unit 616 connected to the bus 610. It should be appreciated that the network interface unit 616 also may be utilized to connect to other types of networks and remote computer systems. The computer architecture 600 also may include an input/output controller 618 for receiving and processing input from a number of other devices, including a keyboard, mouse, or electronic stylus (not shown in FIG. 6). Similarly, the input/output controller 618 may provide output to a display screen, a printer, or other type of output device (also not shown in FIG. 6). It should also be appreciated that via a connection to the network 650 through a network interface unit 616, the computing architecture may enable the retention policy management service 102 to communicate with one or more of the productivity platforms 104 and/or the user device 106.

It should be appreciated that the software components described herein may, when loaded into the CPU 602 and executed, transform the CPU 602 and the overall computer architecture 600 from a general-purpose computing system into a special-purpose computing system customized to facilitate the functionality presented herein. The CPU 602 may be constructed from any number of transistors or other discrete circuit elements, which may individually or collectively assume any number of states. More specifically, the CPU 602 may operate as a finite-state machine, in response to executable instructions contained within the software modules disclosed herein. These computer-executable instructions may transform the CPU 602 by specifying how the CPU 602 transitions between states, thereby transforming the transistors or other discrete hardware elements constituting the CPU 602.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 600 in order to store and execute the software components presented herein. It also should be appreciated that the computer architecture 600 may include other types of computing devices, including hand-held computers, embedded computer systems, personal digital assistants, and other types of computing devices known to those skilled in the art. It is also contemplated that the computer architecture 600 may not include all of the components shown in FIG. 6, may include other components that are not explicitly shown in FIG. 6, or may utilize an architecture completely different than that shown in FIG. 6.

EXAMPLE CLAUSES

The disclosure presented herein may be considered in view of the following clauses.

Example Clause A, a system for deploying unified retention policies across multiple productivity platforms, the system comprising: at least one processor; and at least one memory in communication with the at least one processor, the at least one memory having computer-readable instructions stored thereupon that, when executed by the at least one processor, cause the at least one processor to: obtain productivity platform data corresponding to at least a communication platform and a file hosting platform; determine a unified retention policy defining a retention age threshold and associating at least one action with the retention age threshold; expose a retention policy management portal to enable an administrator to prescribe the unified retention policy to at least the communication platform and the file hosting platform; and enforce the unified retention policy across at least the communication platform and the file hosting platform by: analyzing first data corresponding to the communication platform to identify at least one first file, corresponding to the first data file type, that reaches or exceeds the retention age threshold; analyzing second data corresponding to the file hosting platform to identify at least one second file, corresponding to the second data file type, that reaches or exceeds the retention age threshold; and causing the at least one action to be performed with respect to the at least one first file and the at least one second file.

Example Clause B, the system of Example Clause A, wherein the computer-readable instructions further cause the at least one processor to: obtain account data corresponding to a plurality of user accounts that are provisioned with access to at least the communication platform and the file hosting platform; expose the retention policy management portal to enable the administrator to select, for exclusion from at least a portion of the unified retention policy, at least one of: a communication account of an individual user account, or a file hosting account of the individual user account; and exclude at least one of the communication account or the file hosting account from at least the portion of the unified retention policy.

Example Clause C, the system of any one of Example Clauses A through B, wherein the computer-readable instructions further cause the at least one processor to: receive a request to delete a particular file from at least one of: a communication account corresponding to an individual user account, or a file hosting account corresponding to the individual user account; determine that the particular file does not reach the retention age threshold, wherein the particular file corresponds to at least one of the first data or the second data; retain the particular file within at least one storage device at least until the particular file reaches the retention age threshold; and purge, based on a determination that the particular file reaches or exceeds the retention age threshold, the particular file from the at least one storage device.

Example Clause D, the system of any one of Example Clauses A through C, wherein the computer-readable instructions further cause the at least one processor to prevent, subsequent to the request and prior to purging the particular file from the at least one storage device, the particular file from being displayed on a user device in association with at least one of the communication account or the file hosting account.

Example Clause E, the system of any one of Example Clauses A through D, wherein the at least one action includes purging at least one storage device of the at least one first file and the at least one second file.

Example Clause F, the system of any one of Example Clauses A through E, wherein the computer-readable instructions further cause the at least one processor to: analyze at least one of the first data or the second data to identify a particular file that has been tagged with a label to designate the particular file as a record; and prevent, based on the label, the particular file from being modified until the particular file is purged from the at least one storage device based on the particular file reaching or exceeding the retention age threshold.

While Example Clauses A through F are described above with respect to a system, it is understood in the context of this document that the subject matter of Example Clauses A through F can also be implemented by a device, via a computer-implemented method, and/or via computer-readable storage media.

Example Clause G, a computer-implemented method, comprising: obtaining data corresponding to at least one user account that is provisioned with access to at least a first productivity platform and a second productivity platform; exposing a retention policy management portal configured to receive an instruction to prescribe a unified retention policy to the at least one user account with respect to at least the first productivity platform and the second productivity platform, wherein the unified retention policy defines at least one condition and associates at least one action with the at least one condition; and deploying the unified retention policy across at least the first productivity platform and the second productivity platform by: analyzing the first productivity platform to identify a first plurality of files that satisfy the at least one condition of the unified retention policy; analyzing the second productivity platform to identify a second plurality of files that satisfy the at least one condition of the unified retention policy; and causing the at least one action to be performed with respect to the first plurality of files corresponding to the first productivity platform and the second plurality of files corresponding to the second productivity platform.

Example Clause H, the computer-implemented method of Example Clause G, wherein the at least one condition corresponds to individual files reaching or exceeding a retention age threshold, and wherein the at least one action includes automatically purging the individual files that reach or exceed the retention age threshold from at least one storage device.

Example Clause I, the computer-implemented method of any one of Example Clauses G through H, further comprising preventing the individual files from being deleted from the at least one storage device prior to the individual files reaching or exceeding the retention age threshold.

Example Clause J, the computer-implemented method of any one of Example Clauses G through I, wherein causing the at least one action to be performed with respect to the first plurality of files and the second plurality of files includes prompting a user to indicate whether to retain at least some of the first plurality of files and the second plurality of files.

Example Clause K, the computer-implemented method of any one of Example Clauses G through J, further comprising: receiving, via an individual user account of the at least one user account, a request to delete a particular file from the first productivity platform; causing the particular file to be removed from a storage allotment of the individual user account with respect to the first productivity platform; and based on a determination that the particular file does not reach or exceed a retention age threshold: retaining the particular file in an archive at least until the particular file reaches or exceeds the retention age threshold, and subsequent to the archiving, automatically purging the particular file from the archive based on the particular file reaching or exceeding the retention age threshold.

Example Clause L, the computer-implemented method of any one of Example Clauses G through K, wherein the at least one condition corresponds to individual files being associated with at least one predefined label that is caused to be deployed across at least the first productivity platform and the second productivity platform via the retention policy management portal.

Example Clause M, the computer-implemented method of any one of Example Clauses G through L, further comprising: receiving an indication to associate at least one sensitive information type with the unified retention policy; and automatically associating the individual files with the at least one predefined label based on a determination that the individual files contain the at least one sensitive information type.

Example Clause N, the computer-implemented method of any one of Example Clauses G through M, further comprising: receiving an indication to associate a user-defined search query with the unified retention policy; and automatically associating the individual files with the at least one predefined label based on an analysis of the individual files with respect to the user-defined search query.

Example Clause O, the computer-implemented method of any one of Example Clauses G through N, further comprising: receiving an indication to associate a document fingerprint with the unified retention policy; and automatically associating the individual files with the at least one predefined label based on an analysis of the individual files with respect to the document fingerprint.

While Example Clauses H through O are described above with respect to a method, it is understood in the context of this document that the subject matter of Example Clauses H through O can also be implemented by a device, by a system, and/or via computer-readable storage media.

Example Clause P, a computer-readable storage medium having computer-executable instructions stored thereupon which, when executed by one or more processors of a computing device, cause the one or more processors of the computing device to: expose a retention policy management portal configured to receive an instruction to prescribe a retention policy to a user account with respect to at least one of a first productivity platform or a second productivity platform, wherein the retention policy associates at least one predetermined label with at least a retention age threshold; receive a request to delete a particular file from at least one storage device corresponding to at least one of the first productivity platform or the second productivity platform, wherein the particular file corresponds to the user account and at least one of the first productivity platform or the second productivity platform; determine that the at least one predetermined label is associated with the particular file; prevent, at a first time, the particular file from being purged from at least one storage device based on the at least one predetermined label and a first determination that the particular file does not reach or exceed the retention age threshold; and purge, at a second time that is subsequent to the first time, the particular file from the at least one storage device based on the at least one predetermined label and a second determination that the particular file does reach or exceed the retention age threshold.

Example Clause Q, the computer-readable storage medium of Example Clause P, wherein determining whether the particular file reaches or exceeds the retention age threshold is based on at least one of a creation date of the particular file or a last modification date of the particular file.

Example Clause R, the computer-readable storage medium of any one of Example Clause P through Q, wherein the retention policy management portal is further configured to enable an administrator to publish the at least one predetermined label to the user account to enable the at least one predetermined label to be manually associated with the particular file from the user account.

Example Clause S, the computer-readable storage medium of any one of Example Clauses P through R, wherein purging the particular file from the at least one storage device includes purging the particular file from a first storage corresponding to a web services layer and a second storage corresponding to a local data layer.

While Example Clauses P and S are described above with respect to a system, it is understood in the context of this document that the subject matter of Example Clauses S and S can also be implemented by a device, via a computer-implemented method, and/or via computer-readable storage media.

Example Clause T, a computer-implemented method, comprising: receiving an instruction to prescribe a retention policy to a user account with respect to a productivity platform, wherein the retention policy associates at least one label with at least a first age threshold and a second age threshold; receiving a request to delete a particular file, that corresponds to the user account, from at least one storage device corresponding to the productivity platform; determining that the particular file has been tagged with the at least one label; prevent the particular file from being purged from at least one storage device based on at least one label and a first determination that the particular file does not reach or exceed the first age threshold; and purge the particular file from the at least one storage device based on the at least one label and a second determination that the particular file does reach or exceed the second age threshold.

Example Clause U, the computer-implemented method of Example Clause T, wherein the first age threshold is equal to the second age threshold.

Example Clause V, the computer-implemented method of any of Example Clauses T through U, wherein the first age threshold corresponds to a first label and wherein the second age threshold corresponds to a second label.

While Example Clauses T through V are described above with respect to a method, it is understood in the context of this document that the subject matter of Example Clauses T through V can also be implemented by a device, by a system, and/or via computer-readable storage media.

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A system for deploying unified retention policies across multiple platforms, the system comprising:
    at least one processor; and
    at least one memory in communication with the at least one processor, the at least one memory having computer-readable instructions stored thereupon that, when executed by the at least one processor, cause the at least one processor to:
        obtain platform data corresponding to:
            a first web-based software platform that is configured to store message data in accordance with a first data file type, and
            a second web-based software platform that is configured to store hosted data in accordance with a second data file type that is different than the first data file type;
        determine a unified retention policy comprised of one or more retention rules that are configured based on a rule development scheme that is common to the first web-based software platform and the second web-based software platform and that associates:
            a file characteristic with a retention age threshold, and
            an action with the retention age threshold;
        expose a retention policy management portal that is configured to facilitate prescribing the unified retention policy to the first web-based software platform and the second web-based software platform; and
        in response to receiving, by way of the retention policy management portal, an input indicating an assignment of the unified retention policy to both of the first web-based software platform and the second web-based software platform:
            transmit a first instance of the unified retention policy to the first web-based software platform;
            transmit a second instance of the unified retention policy to the second web-based software platform; and
            transmit a third instance of the unified retention policy to a user device that is provisioned with access to both of the first web-based software platform and the second web-based software platform.

2. The system of claim 1, wherein the computer-readable instructions further cause the at least one processor to:
    obtain account data corresponding to a plurality of user accounts that are provisioned with access to the first web-based software platform and the second web-based software platform;
    expose, by way of a computing device, the retention policy management portal to enable another input that is configured to select, for exclusion from at least a portion of the unified retention policy, at least one of:
        a communication account of an individual user account, or a file hosting account of the individual user account; and
    exclude at least one of the communication account or the file hosting account from the portion of the unified retention policy.

3. The system of claim 1, wherein the computer-readable instructions further cause the at least one processor to:
    receive a request to delete a particular file from at least one of: a communication account corresponding to an individual user account, or a file hosting account corresponding to the individual user account;
    determine that the particular file does not reach the retention age threshold, wherein the particular file corresponds to at least one of the message data or the hosted data;
    retain the particular file within at least one storage device at least until the particular file reaches the retention age threshold; and
    purge, based on a determination that the particular file reaches or exceeds the retention age threshold, the particular file from the at least one storage device.

4. The system of claim 3, wherein the computer-readable instructions further cause the at least one processor to prevent, subsequent to the request and prior to purging the particular file from the at least one storage device, the particular file from being displayed on another user device in association with at least one of the communication account or the file hosting account.

5. The system of claim 1, wherein the computer-readable instructions further cause the at least one processor to:
    identify, based on the message data or the hosted data, a particular file that has been tagged with a label to designate the particular file as a record; and
    prevent, based on the label, the particular file from being modified until the particular file is purged from at least one storage device based on the particular file reaching or exceeding the retention age threshold.

6. The system of claim 1, wherein the user device deploys a retention policy enforcement engine to enforce the unified retention policy with respect to at least a portion of the message data that is stored locally at the user device.

7. A computer-implemented method, comprising:
    obtaining data corresponding to a user account that is provisioned with access to:
        a first web-based software platform that is configured to store message data in accordance with a first data file type, and
        a second web-based software platform that is configured to store hosted data in accordance with a second data file type that is different than the first data file type;
    exposing a retention policy management portal that is configured to receive an instruction to prescribe a unified retention policy to the user account with respect to both of the first web-based software platform and the second web-based software platform, wherein the unified retention policy defines a condition and associates an action with the condition, and wherein the unified retention policy includes one or more rules that are defined in accordance with a rule development scheme that is common to the first web-based software platform and the second web-based software platform; and
    in response to receiving, by way of the retention policy management portal, an input indicating the instruction to prescribe the unified retention policy across both of the first web-based software platform and the second web-based software platform:
        transmit a first instance of the unified retention policy to the first web-based software platform;
        transmit a second instance of the unified retention policy to the second web-based software platform; and
        transmit a third instance of the unified retention policy to a user device associated with the user account that is provisioned with access to both of the first web-based software platform and the second web-based software platform.

8. The computer-implemented method of claim 7, wherein the condition corresponds to individual files reaching or exceeding a retention age threshold, and wherein the action includes automatically purging the individual files that reach or exceed the retention age threshold from at least one storage device.

9. The computer-implemented method of claim 8, further comprising preventing the individual files from being deleted from the at least one storage device prior to the individual files reaching or exceeding the retention age threshold.

10. The computer-implemented method of claim 7, further comprising:
receiving, via the user account, a request to delete a particular file from the first web-based software platform;
causing the particular file to be removed from a storage allotment of the user account with respect to the first web-based software platform; and
based on a determination that the particular file does not reach or exceed a retention age threshold:
retaining the particular file in an archive at least until the particular file reaches or exceeds the retention age threshold, and
subsequent to the archiving, automatically purging the particular file from the archive based on the particular file reaching or exceeding the retention age threshold.

11. The computer-implemented method of claim 7, wherein the condition corresponds to individual files being associated with at least one predefined label that is caused to be deployed across at least the first web-based software platform and the second web-based software platform via the retention policy management portal.

12. The computer-implemented method of claim 11, further comprising:
receiving an indication to associate at least one sensitive information type with the unified retention policy; and
automatically associating the individual files with the at least one predefined label based on a determination that the individual files contain the at least one sensitive information type.

13. The computer-implemented method of claim 11, further comprising:
receiving an indication to associate a user-defined search query with the unified retention policy; and
automatically associating the individual files with the at least one predefined label based on an analysis of the individual files with respect to the user-defined search query.

14. The computer-implemented method of claim 11, further comprising:
receiving an indication to associate a document fingerprint with the unified retention policy; and
automatically associating the individual files with the at least one predefined label based on an analysis of the individual files with respect to the document fingerprint.

15. A computer-readable storage medium having computer-executable instructions stored thereupon which, when executed by one or more processors of a computing device, cause the one or more processors of the computing device to:
expose a retention policy management portal that is configured to receive an instruction to prescribe a retention policy, that associates a predetermined label with a retention age threshold, to a user account with respect to both of:
a first web-based software-platform that is configured to store message data in accordance with a first data file type, and
a second web-based software-platform that is configured to store hosted data in accordance with a second data file type that is different than the first data file type;
in response to receiving, by way of the retention policy management portal, an input indicating the instruction to prescribe the retention policy across both of the first web-based software platform and the second web-based software platform:
transmit a first instance of the retention policy to the first web-based software platform;
transmit a second instance of the retention policy to the second web-based software platform, wherein the retention policy includes one or more rules that are defined in accordance with a rule development scheme that is common to the first web-based software platform and the second web-based software platform; and
transmit a third instance of the retention policy to a user device associated with the user account that is provisioned with access to both of the first web-based software platform and the second web-based software platform;
receive a request to delete a particular file from storage corresponding to at least one of the first web-based software platform or the second web-based software platform, wherein the particular file corresponds to the user account and at least one of the first web-based software platform or the second web-based software platform;
determine that the predetermined label is associated with the particular file;
prevent, at a first time, the particular file from being purged from the storage based on the predetermined label and a first determination that the particular file does not reach or exceed the retention age threshold; and
purge, at a second time that is subsequent to the first time, the particular file from the storage based on the predetermined label and a second determination that the particular file does reach or exceed the retention age threshold.

16. The computer-readable storage medium of claim 15, wherein determining whether the particular file reaches or exceeds the retention age threshold is based on at least one of a creation date of the particular file or a last modification date of the particular file.

17. The computer-readable storage medium of claim 15, wherein the retention policy management portal is further configured to enable an administrator to publish the predetermined label to the user account to enable the predetermined label to be manually associated with the particular file from the user account.

18. The computer-readable storage medium of claim 15, wherein purging the particular file from the storage includes purging the particular file from a first storage corresponding to a web services layer and a second storage corresponding to a local data layer.

19. A computer-implemented method, comprising:
receiving an instruction to prescribe a unified retention policy to a user account with respect to both of a first web-based software platform that is configured to store first data in accordance with a first data file type and a second web-based software-platform that is configured to store second data in accordance with a second data file type that is different than the first data file type, wherein the unified retention policy associates a label with both a first age threshold and a second age threshold, and wherein the unified retention policy includes one or more rules that are defined in accordance with a rule development scheme that is common to the first web-based software platform and the second web-based software platform;

in response to receiving an input indicating the instruction to prescribe the retention policy across both of the first web-based software platform and the second web-based software platform:
  transmitting a first instance of the unified retention policy to the first web-based software platform;
  transmitting a second instance of the unified retention policy to the second web-based software platform; and
  transmitting a third instance of the unified retention policy to a user device associated with the user account that is provisioned with access to both of the first web-based software platform and the second web-based software platform;

receiving a request to delete a particular file, that corresponds to the user account, from storage corresponding to the first web-based software platform;

determining that the particular file has been tagged with the label;

preventing the particular file from being purged from storage based on the label and a first determination that the particular file does not reach or exceed the first age threshold; and purging the particular file from the storage based on the label and a second determination that the particular file does reach or exceed the second age threshold.

20. The computer-implemented method of claim 19, wherein the first age threshold is equal to the second age threshold.

21. The computer-implemented method of claim 19, wherein the first age threshold corresponds to a first label and wherein the second age threshold corresponds to a second label.

\* \* \* \* \*